US009272956B2

(12) United States Patent
Backhaus-Ricoult et al.

(10) Patent No.: US 9,272,956 B2
(45) Date of Patent: Mar. 1, 2016

(54) METHOD FOR CONTROLLING ALUMINUM TITANATE CERAMIC FILTER PROPERTIES

(75) Inventors: Monika Backhaus-Ricoult, Horseheads, NY (US); Christopher Raymond Glose, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1026 days.

(21) Appl. No.: 13/117,510

(22) Filed: May 27, 2011

(65) Prior Publication Data

US 2012/0297830 A1 Nov. 29, 2012

(51) Int. Cl.
C04B 35/195 (2006.01)
C04B 35/47 (2006.01)
(Continued)

(52) U.S. Cl.
CPC ........... *C04B 35/478* (2013.01); *C03C 10/0036* (2013.01); *C04B 38/0006* (2013.01); *C04B 41/009* (2013.01); *C04B 41/5092* (2013.01); *C04B 41/85* (2013.01); *C04B 2111/00793* (2013.01); *C04B 2235/3201* (2013.01); *C04B 2235/322* (2013.01); *C04B 2235/3203* (2013.01); *C04B 2235/3206* (2013.01); *C04B 2235/3208* (2013.01); *C04B 2235/3213* (2013.01); *C04B 2235/3217* (2013.01); *C04B 2235/3218* (2013.01); *C04B 2235/3234* (2013.01); *C04B 2235/3236* (2013.01); *C04B 2235/34* (2013.01); *C04B 2235/3409* (2013.01);
(Continued)

(58) Field of Classification Search
CPC ...... C04B 35/478; C04B 35/18; C04B 35/19; C04B 35/195; C04B 35/46; C04B 35/462; C04B 2235/3418; C04B 2235/3234; C04B 2235/3481

See application file for complete search history.

(56) References Cited

U.S. PATENT DOCUMENTS 4,767,731 A * 8/1988 Asami ................... C04B 35/478
501/128
5,066,626 A * 11/1991 Fukao ................... C04B 35/478
501/128

(Continued)

FOREIGN PATENT DOCUMENTS

EP 0 506 475 9/1992
GB 1081142 8/1967

(Continued)

OTHER PUBLICATIONS

PCT Search Report and Written Opinion issued on May 22, 2012, in corresponding PCT Application Serial No. PCT/US2012/026724.

(Continued)

*Primary Examiner* — Jason L Lazorcik
(74) *Attorney, Agent, or Firm* — John L. Haack

(57) ABSTRACT

A method for improving the thermo-mechanical properties of an aluminum-titanate composite, the composite including at least one of strontium-feldspar, mullite, cordierite, or a combination thereof, including:
combining a glass source and an aluminum-titanate source into a batch composition; and
firing the combined batch composite composition to produce the aluminum-titanate composite.
Another method for improving the thermo-mechanical properties of the composite dips a fired composite article into phosphoric acid, and then anneal the dipped composite article. The resulting composites have a thin glass film situated between the ceramic granules of the composite, which can arrest microcrack propagation.

9 Claims, 23 Drawing Sheets

(51) Int. Cl.
*C04B 35/478* (2006.01)
*C04B 38/00* (2006.01)
*C04B 41/85* (2006.01)
*C03C 10/00* (2006.01)
*C04B 41/00* (2006.01)
*C04B 41/50* (2006.01)
*C04B 111/00* (2006.01)

(52) U.S. Cl.
CPC ............. *C04B 2235/3427* (2013.01); *C04B 2235/3463* (2013.01); *C04B 2235/3481* (2013.01); *C04B 2235/36* (2013.01); *C04B 2235/365* (2013.01); *C04B 2235/447* (2013.01); *C04B 2235/449* (2013.01); *C04B 2235/5224* (2013.01); *C04B 2235/85* (2013.01); *C04B 2235/9607* (2013.01)

(56) References Cited

U.S. PATENT DOCUMENTS

| | | | |
|---|---|---|---|
| 7,071,135 B2 * | 7/2006 | Ogunwumi | C03C 3/083 264/630 |
| 7,259,120 B2 * | 8/2007 | Ellison et al. | 501/134 |
| 7,722,798 B2 * | 5/2010 | Takahashi | C04B 35/478 264/630 |
| 7,960,009 B2 * | 6/2011 | Backhaus-Ricoult | C04B 35/195 264/631 |
| 8,663,777 B2 * | 3/2014 | Suwabe | B29C 71/02 422/180 |
| 2005/0239640 A1 * | 10/2005 | Nilsson | B01D 39/2093 502/202 |
| 2006/0021308 A1 * | 2/2006 | Merkel | B01D 46/2429 55/523 |
| 2006/0281627 A1 * | 12/2006 | Ellison | C04B 35/478 501/134 |
| 2009/0220734 A1 * | 9/2009 | Backhaus-Ricoult | C04B 35/478 428/116 |
| 2010/0222200 A1 * | 9/2010 | Tepesch | C04B 35/478 501/83 |
| 2010/0310819 A1 * | 12/2010 | Suwabe | B29C 71/02 428/116 |
| 2011/0124484 A1 * | 5/2011 | Maki | C01G 23/002 501/32 |
| 2011/0151181 A1 * | 6/2011 | Liu | C04B 35/195 428/116 |
| 2013/0214463 A1 * | 8/2013 | Suwabe | B29C 71/02 264/630 |

FOREIGN PATENT DOCUMENTS

| | | |
|---|---|---|
| WO | 2004/011386 | 2/2004 |
| WO | 2008/005249 | 1/2008 |
| WO | WO 2009063997 A1 * | 5/2009 |

OTHER PUBLICATIONS

U.S. Appl. No. 61/067,615, filed Feb. 29, 2008, Backhaus-Ricoult, et al.

* cited by examiner

METHOD FOR CONTROLLING ALUMINUM TITANATE CERAMIC FILTER PROPERTIES

The entire disclosure of any publication or patent document mentioned herein is incorporated by reference.

FIELD

The disclosure relates generally to manufacturing methods for controlling aluminum titanate ceramic filter properties, such as for use in combustion exhaust emission control systems.

BACKGROUND

Various manufacturing methods are known for preparing aluminum titanate ceramic filters. The present disclosure provides manufacturing methods for controlling the physical properties of the resulting aluminum titanate ceramic filter.

SUMMARY

The disclosure provides methods for controlling the physical properties, such as strength of aluminum titanate (AT) ceramic filters, such as a honeycomb body, and methods of making and use of the substrates or filters.

BRIEF DESCRIPTION OF THE DRAWINGS

In embodiments of the disclosure.

DETAILED DESCRIPTION

Figure 1A:
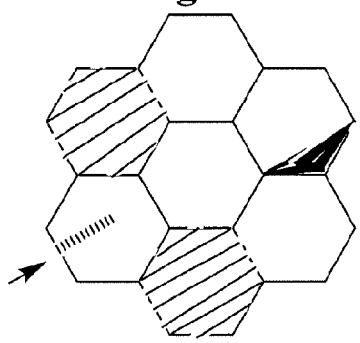
FIGS. 1A to 1F summarize the comparative toughening of microcracked ceramics having thin intergranular glass.

Various embodiments of the disclosure will be described in detail with reference to drawings, if any. Reference to various embodiments does not limit the scope of the invention, which is limited only by the scope of the attached claims. Additionally, any examples set forth in this specification are not limiting and merely set forth some of the many possible embodiments of the claimed invention.

Definitions

"Porosity," and like terms generally refer to the void spaces, or synonymously, pores within the walls of the honeycomb material. The void space in a honeycomb occupied by the macroscopic channels is excluded. "Porosity," and like terms generally refer to the total void space in a honeycomb material that can be attributed to the presence of pores and excludes the void space in a honeycomb material attributable to the presence of macroscopic channels or vias of the honeycomb, or the ratio of the pore volume to the total volume of a pulverized solid material, and may be expressed as percent porosity (% P). Porosity, and like aspects of the ceramic bodies, are mentioned in commonly owned and assigned U.S. Pat. No. 6,864,198. Parameters such as d10, d50 and d90 relate to the pore size distribution. The quantity d50 is the median pore size (MPS) based upon pore volume, and is measured in micrometers; thus, d50 is the pore diameter at which 50% of the open porosity of the ceramic has been intruded by mercury (mercury porosimetry). The quantity d90 is the pore diameter at which 90% of the pore volume is comprised of pores whose diameters are smaller than the value of d90; thus, d90 is equal to the pore diameter at which 10% by volume of the open porosity of the ceramic has been intruded by mercury. The quantity dl0 is the pore diameter at which 10% of the pore volume is comprised of pores whose diameters are smaller than the value of d10; thus, d10 is equal to the pore diameter at which 90% by volume of the open porosity of the ceramic has been intruded by mercury. The values of d10 and d90 are also in units of micrometers. The quantity (d50-d10/d50) describes the width of the distribution of pore sizes finer than the median pore size, d50.

"Super additive," "super addition," and like terms generally refer to adding additional ingredients or materials to a batch composition or like formulation in excess of, or in addition to, a 100 wt % base inorganics formulation. A base formulation totaling 100 wt % can be, for example, a combination of ceramic forming ingredients in an amount from 20 to 70 weight percent and an inorganic filler material in an amount from 80 to 30 weight percent, and the super additives can be, for example, one or more pore formers, a glass former source material, or a combination thereof, with or without other super additives, and can be present or added to the batch in, for example, from about 50 to about 300 wt % in addition to the base formulation 100 wt %.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, and like values, and ranges thereof, employed in describing the embodiments of the disclosure, refers to variation in the numerical quantity that can occur, for example: through typical measuring and handling procedures used for making compositions, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture. The claims appended hereto include equivalents of these "about" quantities.

"Consisting essentially of" in embodiments refers, for example, to a catalytic honeycomb filter article having relatively high disclosed porosity and increased strength, to a method of making a catalytic filter article and precursors thereto, devices incorporating the catalytic filter article, and can include the components or steps listed in the claim, plus other components or steps that do not materially affect the basic and novel properties of the compositions, articles, apparatus, or methods of making and use of the disclosure, such as particular reactants, particular additives or ingredients, a particular agents, a particular surface modifier or condition, or like structure, material, or process variable selected. Items that may materially affect the basic properties of the components or steps of the disclosure or that may impart undesirable characteristics to the present disclosure include, for example, an article having significantly reduced porosity, and little or no improvement in strength or microcrack propagation control of the article, and that are beyond the values, including intermediate values and ranges, defined and specified herein.

The indefinite article "a" or "an" and its corresponding definite article "the" as used herein means at least one, or one or more, unless specified otherwise. Abbreviations, which are well known to one of ordinary skill in the art, may be used (e.g., "h" or "hr" for hour or hours, "g" or "gm" for gram(s), "mL" for milliliters, and "rt" for room temperature, "nm" for nanometers, and like abbreviations).

Specific and preferred values disclosed for components, ingredients, additives, and like aspects, and ranges thereof, are for illustration only; they do not exclude other defined values or other values within defined ranges. The compositions, apparatus, and methods of the disclosure can include any value or any combination of the values, specific values, more specific values, and preferred values described herein. Cordierite and aluminum titanate (AT)-based honeycomb substrates have been used for a variety of applications such as catalytic converter substrates and filters for diesel particulate emission. In response to the increasingly restrictive emission standards for light and heavy duty vehicles, the filter materials need to be highly porous to allow gas flow through the walls without compromising the engine power; show high filtration efficiency for emitted particles and not suffer major pressure drop. The filters also have to withstand the corroding environment of the exhaust gas and be able to bear severe thermal shock during rapid heating and cooling. High material green strength and high intermediate firing strength are desired to achieve high precision in extruded shape and high firing selects and also allows implementation of faster firing cycles with associated energy savings. High mechanical robustness is also needed to withstand the mechanical constraints during filter handling and canning.

Cordierite and aluminum titanate-based materials have low thermal expansion and are therefore suited for applications having high thermal shock resistance. Both materials show strong anisotropy in their thermal expansion with different crystallographic directions exhibiting positive and negative expansion. Due to the anisotropy in thermal expansion, mismatch strains build up between grains with different crystallographic orientation and can lead to microcracking. Polycrystalline cordierite and aluminum titanate ceramics can undergo extensive microcracking during thermal cycling.

Microcracks open during cooling and close, sometimes even heal, during heating. This creates a hysteresis response to thermal cycling with differences between the heating and cooling curve that can be attributed to the presence of microcracks. As a result of the microcracking, the overall thermal expansion of the ceramic piece is lowered compared to the crystallographic average CTE.

On first impression, lowering of CTE through microcracking seems beneficial; the thermal shock resistance of the material, which is proportional to the material's strength and inversely proportional to its elastic modulus and thermal expansion, is expected to be improved. However, material strength also decreases with increasing microcrack density. Microcrack densities in cordierite remain rather low, due to the small difference in crystallographic thermal expansion, and large grain (domain) sizes that are needed to reach the microcracking stress threshold. As a result of the larger anisotropy in crystallographic expansion, microcrack densities in aluminum titanate-based materials can be very high and strongly limit the ceramic's strength. Due to the very high anisotropy and high absolute values in thermal expansion, the microcrack density is always high in aluminum titanate-based materials, but differs from material to material depending on, for example, aluminum titanate grain size, local misorientation of adjacent grains, medium range orientation arrangement of the grains (domains), and the nature and distribution of second phases. Since thermal expansion, strength, and porosity of aluminum titanate-based materials are highly coupled through the microcrack density, it remains a challenge to make highly porous aluminum titanate-based honeycomb ceramic articles that combine low thermal expansion, high porosity, low Young modulus, high strength, and are attractive for high-performance diesel particulate filter applications. Tightening of regulations toward higher filtration efficiency, further reduced $CO_2$ emission, and less fuel consumption motivate automakers to use filters with the lowest possible pressure drop at the highest possible filtration efficiency, both at improved thermal shock resistance and extended lifetime. Such filter specifications can impose, for example, higher porosity, thinner honeycomb walls, or both for filters, which require significant improvements in material strength at a given pressure drop and filtration efficiency.

Several approaches for material strength improvement have been demonstrated in the past for aluminum titanate-based ceramics, for example:

1. The aluminum titanate grain size in the material can be reduced, leading to a lower microcrack density in the material and an increase in material strength. The concept was implemented in aluminum titanate-based materials made from fine inorganic alumina fiber with a resulting aluminum titanate grain size of about 3 to 7 micrometers on microstructures and fibrous AT materials (see commonly owned and assigned copending application U.S. Ser. No. 61/067,615, filed Feb. 29, 2008, entitled "Acicular Porous Ceramic Article and Manufacture Thereof").

2. Improved thermo-mechanical properties were also implemented by Tepesch et al., by choice of a narrow raw material (alumina) particle size distribution, see commonly owned and assigned copending application US20100222200A1 entitled "Aluminum Titanate-Containing Ceramic-Forming Batch Materials And Methods Using The Same".

3. Aluminum titanate in the material can be textured so that the overall microcrack density is reduced. Such texturing was realized in the above mentioned copending application U.S. Ser. No. 61/067,615, where templated growth of aluminum titanate on inorganic alumina fiber led to a preferential alignment of the negative expansion c-axis of growing aluminum titanate grains in the fiber axis and, since fibers aligned upon extrusion in the extrusion axis, also resulted in the texture of the aluminum-titanate in the honeycomb axis.

4. Domain size can be kept small so that the local stresses remain small and anisotropic, and the overall microcrack density is kept low. Extremely small domain size and high strength have been demonstrated in advanced aluminum-titanate-type materials with domain sizes of about 20 micrometers and less. A domain refers to an entity of neighboring grains that do not exceed a mis-orientation of 15 degrees in their negative expansion c-axis (see the abovementioned U.S. Ser. No. 61/067,615).

In embodiments, the disclosure provides a method for improving the thermo-mechanical properties of an aluminum-titanate composite, the composite including at least one of strontium-feldspar, mullite, cordierite, or a combination thereof, comprising:

combining a glass source and an aluminum-titanate source into a batch composition; and firing the combined batch composition to produce the aluminum-titanate composite, wherein the glass source provides a glass film, a glass-ceramic film, or both, between the ceramic granules of the composite.

The glass source, such as a sintering aid, can be, for example, at least one of a lithium oxide, a boron oxide, a silica, a phosphorus oxide, a precursor or source of any of the foregoing, and like materials, or mixtures or combinations thereof The aluminum-titanate source batch composition can be, for example, at least one of an aluminum source and a titania source. Sources of alumina can include, for example, powders that when heated to a sufficiently high temperature in the absence of other raw materials, will yield substantially pure aluminum oxide. Examples of such alumina sources include alpha-alumina, a transition alumina such as gamma-alumina or rho-alumina, hydrated alumina, gibbsite, corundum ($Al_2O_3$), boehmite (AlO(OH)), pseudoboehmite, aluminum hydroxide ($Al(OH)_3$), aluminum oxyhydroxide, and mixtures thereof In embodiments, the at least one alumina source can be, for example, at least 40 wt %, at least 45 wt %, or at least 50 wt % of the inorganic materials, such as, for example, 49 wt % of the inorganic materials. In embodiments, the at least one alumina source can be selected so that the median particle diameter of the at least one alumina source is from 1 to 45 microns, for example, from 2 to 25 microns.

Sources of titania can include, for example, rutile, anatase, strontium titanate, titanium silicates, amorphous titania, and mixtures thereof In embodiments, the at least one titania source can comprise at least 20 wt % of the inorganic materials, for example, at least 25 wt % or at least 30 wt % of the inorganic materials. In embodiments, the inorganic materials can further comprise at least one additional material. In embodiments, the at least one additional material can be chosen from silica, oxides (e.g., lanthanum oxide), carbonates (e.g., calcium carbonate and strontium carbonate), nitrates, and hydroxides. In embodiments, the at least one additional material can be silica, which can further comprise at least 5 wt % of the inorganic materials, for example, at least 8 wt % or at least 10 wt % of the inorganic materials.

Sources of silica include, for example, non-crystalline silica, such as fused silica or sol-gel silica, silicone resin, low-alumina substantially alkali-free zeolite, diatomaceous silica, kaolin, and crystalline silica, such as quartz or cristobalite. Additionally, the sources of silica may include silica-forming sources that comprise a compound that forms free silica when heated, for example, silicic acid or a silicon organometallic compound. In embodiments, mullite or other aluminum silicates, or more complex silicates, can also be a mixed alumina-silica source. Thus, the alumina source can contain other constituents of the final composite.

The combining of the glass source can be accomplished by, for example, at least one of:

adding a combination of silica and an alkali oxide source, such as lithium oxide, sodium oxide, potassium oxide, or their precursors, such as hydroxides, halides, and like sources, to the batch in an amount of 0.3 to 5 wt %, preferably 0.3 to 3 wt %, or more preferably 0.4 to 1 wt %;

adding a phosphorous oxide source to the batch in an amount of 0.1 to 3 wt %, and preferably 0.1 to 1%;

adding a boron oxide source to the batch in an amount of 0.1 to 2 wt %, and preferably 0.1 to 1%;

or a combination thereof, the weight % can be based on a superaddition relative to the total weight of the batch composition.

The glass source can produce a glass or glass-ceramic phase during an early stage of firing the batch, and the glass or glass-ceramic phase transforms during a later stage of firing the batch, the transformation comprising at least one of:

a partial glass or glass-ceramic phase evaporation;

a glass or glass-ceramic phase crystallization;

a glass or glass-ceramic phase incorporation into the composite phase;

or a combination thereof.

As examples, Li sources can partially evaporate, B sources can partially evaporate and leave the residual glass having a different composition, P sources can redistribute within the composite, and Si—La-Ti sources can partially crystallize. In embodiments, the combining and firing can improve the composite strength (porosity-normalized) by, for example, 5 to 25% at a CTE less than $10 \times 10^{-7} K^{-1}$ (preferably $3 \times 10^{-7} K^{-1}$) at 50% porosity compared to the composite prepared in the absence of the glass source. The results are believed to be applicable to other porosities.

In embodiments, the firing can be accomplished, for example, at 1390° C. to 1410° C., for 10 to 20 hours.

In embodiments, at the same top-temperature hold-time:

the firing temperature can be, for example, reduced by at least 25° C.;

the firing time can be, for example, reduced by at least 10%;

or a combination of reduced firing temperature and reduced firing time, to provide the same useable product compared to the method practiced free of the glass source.

In embodiments, the combining and firing the batch including the glass source is believed to accelerate aluminum-titanate phase formation during an initial stage of firing the batch, at lower temperature, in less time, or both, compared to a batch without the included glass source. The combining and firing the batch including the glass source can provide the composite having 3 to 5 micrometer smaller median ceramic grain size. As a result of the smaller grain size the composite can have a higher strength compared to a ceramic prepared from a batch without the glass source.

In embodiments, the disclosure provides a method for improving the thermo-mechanical properties of an aluminum titanate-based composite, comprising:

dipping a fully fired aluminum titanate-based composite into an aqueous phosphorous acid solution of 0.5 to 10 wt %; and annealing the dipped composite, to provide phosphorous incorporation into the resulting composite of 0.5 to 2 wt %, the weight % being based on a superaddition relative to the total weight of the un-dipped composite.

In embodiments, the disclosure provides a method for toughening a microcracked aluminum titanate ceramic, comprising:

creating an intergranular glass film within the ceramic, the film having a thickness of from about 20 nm to 500 nm, and the film interacting with the microcracks and limiting uncontrolled growth of the microcracks.

In embodiments, the ceramic can be toughened from about 5 to about 25%, as demonstrated by, for example, the increase in the modulus of rupture measured by 4-point bending relative to a ceramic prepared without the intergranular glass film.

In embodiments, the disclosure provides a method comprising dipping a fired composite article into an aqueous phosphorous acid solution of 0.5 to 10 wt %, and annealing the dipped article, to provide the composite having phosphorous incorporation after firing of 0.5 to 2 wt % based on the weight of the fired composite.

In embodiments, the disclosure provides a method for improving the thermo-mechanical properties of an aluminum-titanate composite, the composite including at least one of strontium-feldspar, mullite, cordierite, or a combination thereof, that comprises, consists essentially of, or consists of:

combining a glass source and an aluminum-titanate source into a batch composition; and firing the combined batch composite composition to produce the aluminum-titanate composite, wherein the glass source provides a glass film, a glass-ceramic film, or both, between the ceramic granules of the composite.

In embodiments, the disclosure provides a method for improving the thermo-mechanical properties of an aluminum titanate-based composite, that comprises, consists essentially of:

dipping a fully fired aluminum titanate-based composite into an aqueous phosphorous acid solution of 0.5 to 10 wt %; and annealing the dipped composite, to provide phosphorous incorporation into the resulting composite of 0.5 to 2 wt %, the weight % being based on a superaddition relative to the total weight of the un-dipped composite.

In embodiments, the disclosed compositions and articles thereof, and the method of making and use provide one or more advantageous features or aspects, for example, as discussed below. Features or aspects recited in any of the claims are generally applicable to all facets of the invention. Any recited single or multiple feature or aspect in any one claim can be combined or permuted with any other recited feature or aspect in any other claim or claims.

In embodiments, the disclosure provides methods of making ceramic articles, which methods are advantaged by using porous alumina-titanate based ceramic articles for filter and substrate applications, and more particularly to an improved batch composition and process for making ceramic articles employing suitable glass-forming agents in the batch. The glass-forming agents form a glassy phase that accelerates the aluminum titanate formation during an initial firing stage of the batch. At later firing stages, the glass-forming agents can, for example, partially evaporate, crystallize, incorporate into the final product phase, or a combination thereof, to leave a fired ceramic article with a thin intergranular glass film and overall improved thermo-mechanical properties. The resulting ceramic materials have, for example, improved strength, low thermal expansion, and high porosity. The attributes of the products can provide higher thermal shock resistance through improved fracture toughness (e.g., low thermal expansion, high strength, and low elastic modulus) compared to existing products and known methods. The attributes also include an improved pore size distribution having no, or a significant decrease of, small size pores. These material properties can provide, for example, improved filter characteristics, lower pressure drop, higher filtration efficiency, and higher thermal shock resistance.

A disadvantage of a known batch composition without particulate glass former addition or with a sintering additive, such as lanthanum oxide, is its tendency to form very large, localized glass pockets and which pockets do not extensively wet the grain boundaries and interfaces in the composite.

In embodiments, the disclosure provides methods for toughening microcracked aluminum titanate-based ceramics comprising incorporating a thin intergranular glass film that interacts with the microcracks and limits uncontrolled microcrack growth. The method improves the strength and toughness of the ceramic material and enhances the diesel particle filter (DPF) thermal shock resistance. The filters can have a wider operating temperature range.

In embodiments, the present disclosure provides a method for improving the thermo-mechanical properties of aluminum titanate-based composites (AT) by, for example, including glass forming aids, that is, an engineered glass phase which can achieve improved material strength at low thermal expansion and high porosity. Current DuratrapAT® materials are made of an aluminum titanate-strontium feldspar composite with additional minor phases, including a glass. The glass in DuratrapAT® is confined to rare, large size pockets and does not penetrate and wet the grain boundaries and interfaces. In known AT-based materials, microcracks propagate intragranularly through the aluminum titanate and feldspar grains, with no apparent preference for either and undergo only limited crack interaction with the planar defects within the feldspar grains. No particular or special interaction of the cracks is observed with the glass pockets in DuratrapAT®.

Although not desired to be limited by theory, it is believed that a thin, intergranular glass film (having lower strength than the feldspar) in aluminum titanate-strontium feldspar composites can offer a preferred crack path for propagating microcracks along the wetted grain boundaries and interfaces, so that the intragranular microcracks in the aluminum titanate grains propagate through the aluminum titanate grain and then preferentially through the intergranular glass and no longer through the feldspar grains. Interaction between the intergranular glass and the propagating cracks produce crack deflection, interface debonding, crack bifurcation, etc., thus dissipating energy, so that the crack propagation is slowed down and eventually stopped. Thus the intergranular glass that surrounds the aluminum titanate grains can limit or decrease the crack propagation from one aluminum titanate grain to the next. Such confinement or containment of microcracking to the aluminum titanate grain and its surrounding glass film provides significant enhancement in toughness. The energy barrier for crack growth beyond the aluminum titanate grain and its surrounding intergranular glass film is increased and thus long-range crack propagation and growth of microcracks into detrimental macroscopic cracks is retarded. The result is a higher strength material with high fracture toughness. In embodiments, a composite with a very regular phase distribution and lack of percolation of the aluminum titanate is preferred and shows the strongest effects. Preferred attributes of the glass are low liquid phase formation temperature, suitable viscosity, and high wettability together with a strength of the resulting glass that is lower than that of the feldspar. The glass phase should wet the aluminum titanate grains well even at low levels.

Various intergranular glasses can be selected. Their level or amount (wt. %) should remain relatively small, for example, from about 0.3 weight % to about 3 weight %, so that the CTE of the material is not significantly altered. The glass should be compatible with the aluminum titanate and feldspar. It is desirable that excess of the glass forming ingredient, for example, either evaporates (example of boron oxide during firing at temperatures >1400° C.) or incorporates into the feldspar (lithium oxide or phosphorous oxide), or both, so that the amount of intergranular glass is kept very low and a very thin intergranular glass film is obtained.

The glass source (i.e., the glass forming aid) can further introduce an early onset and also an earlier completion of the aluminum titanate formation in the reactive firing, so that a several micrometer smaller median aluminum titanate grain size can be obtained by this approach. In examples of particular aluminum titanate-based composites where during the reactive firing full formation of the aluminum titanate product phase is reached at 1390° C., a rise in the firing temperature by 25° C. produces a doubling in aluminum titanate grain size. While the precise yield and grain growth evolution can depend on the raw material type, particle size, and on the firing schedule, the general trend of grain growth during higher temperature sintering is a known phenomenon. Additionally, in the presence of glass formers, shorter or lower top temperature firing cycles are particularly useful.

In embodiments, the disclosure provides methods of making ceramic articles, which methods are advantaged by using glass forming sintering aids, such as lithium oxide, boron oxide, silica, titanio-alumino silicate, and phosphorus oxide. The examples of lithium oxide and boron oxides have been chosen, in embodiments, as representative examples of the class of glass forming sintering-aids, such as alkali-containing glasses, magnesio-alumino-silicates, and like low melting silicate glasses.

In embodiments, the present disclosure provides examples of aluminum titanate-feldspar composites that contain an intergranular phase prepared by, for example, combining excess silica with lithium oxide; adding phosphorous oxide with the green batch; adding boron oxide with the green batch; adding alumino-titanio-silicate with the green batch; dipping the fired ceramic into phosphorous acid, or combinations thereof.

For additional definitions, descriptions, and methods of siliceous formulations, silica materials and related metal oxide materials, see for example, R. K. Iler, The Chemistry of Silica, Wiley-Interscience, 1979.

In embodiments, the present disclosure provides a number of advantages, including for example:

1. Presence of thin intergranular glass films induce preferred crack propagation in aluminum titanate-feldspar composites and retard the long-range crack propagation, to provide improved strength/fracture toughness to the material with otherwise unaltered physical properties. Improved material strength and toughness (compared to, for example, Corning's current Duratrap AT® material and its porosity-engineered derivatives) are desired, for example, to attain improved thin wall and high porosity filters for integrated SCR applications.

2. Glass forming additives induce an early onset of the aluminum titanate formation and allow completion of the overall reaction at lower temperature, shorter time, or both, so that the resulting overall aluminum titanate grain size is smaller and the material strength improved.

Figure 1B:
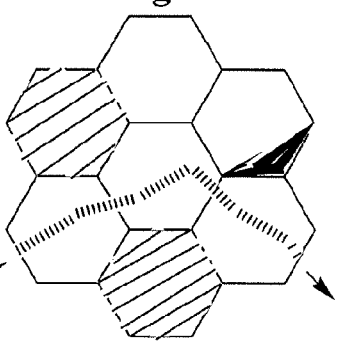
Figure 1C:
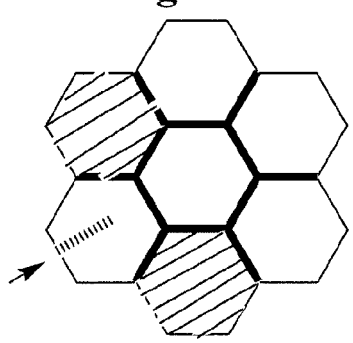
Figure 1D:
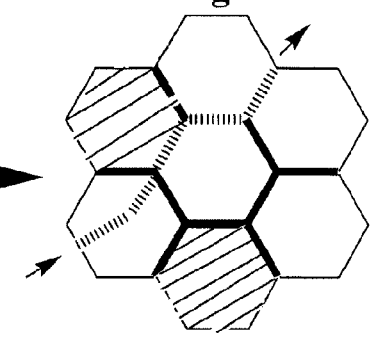

Referring to the figures, FIGS. 1 illustrates the general toughening principle discussed above and achieved by thin intergranular glass films in microcracked ceramics (FIGS. 1E to 1F) compared to materials without any intergranular glass film (FIGS. 1A to 1B) or thick intergranular glass film (FIGS. 1C to 1D). FIGS. 1A, 1C, and 1E show the schematic composite material with its aluminum titanate grains (open or unshaded) and feldspar grains (cross-hatched) prior to application of thermo-mechanical stress with an existing small microcrack (1111111-line), FIGS. 1B, 1D, and 1F sketch the material after application of thermo-mechanical stress and propagation of the microcrack.

FIG. 1A and 1B schematically show an aluminum titanate (open grains)-feldspar (cross-hatched grains) composite having a glass pocket (black) before (1A) and after (1B) crack propagation, respectively. An initial microcrack (111111111-line) in FIG. 1A propagates under load or mechanical stress or thermo-mechanical stress through the aluminum titanate and feldspar grains shown in FIG. 1B. FIGS. 1A and 1B, respectively, schematically show a two-phase microcracked ceramic without any intergranular glass films having an initial small microcrack and propagated microcrack after having suffered thermo-mechanical stress. The microcrack has propagated through aluminum titanate and feldspar grains and extended over a large relative area.

FIGS. 1C and 1D schematically show an aluminum titanate (open grains)-feldspar (cross-hatched grains) composite having thick intergranular glass films (thick borders or grain boundaries) before (1C) and after (1D) crack propagation, respectively. The initial microcrack (111111111-line) in FIG. 1C propagates under load or mechanical stress or thermo-mechanical stress directly on a short path through the thick glass film. The thick film of glass in the grain boundaries behaves like a bulk glass, fractures easily, and allows easy crack propagation, so that the crack propagates through the entire "piece." The microcrack can propagate indiscriminately through the glass phase and some aluminum titanate grains and extend over a very large relative area. The microcrack does not encounter substantial dissipation of the strain energy; thus the propagation of the microcrack can be very extensive and can lead to failure of the piece if the microcrack crosses a major fraction of the piece.

Figure 1E:
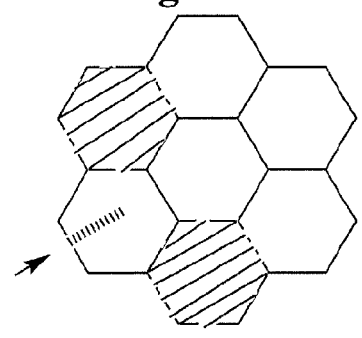
Figure 1F:
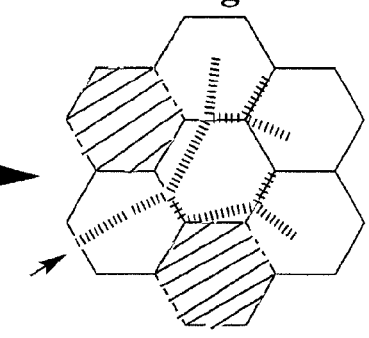

FIGS. 1E and 1F schematically show an aluminum titanate (open grains)-feldspar (cross-hatched grains) composite having thin intergranular glass films (thin line along the grain boundaries) before (1E) and after (1F) crack propagation, respectively. The initial microcrack (111111111-line) in FIG. 1E propagates under load, mechanical stress, or thermo-mechanical stress through the thin glass film, interacting on its long path with the adjacent grains and other glass film. For example, crack deflection, crack branching, interface debonding, and like phenomena, can be active so that a long crack path or extended crack pattern is obtained, where considerable "cracking energy" can be dissipated so that the propagating crack can be terminated.

The thin intergranular glass film does not have the properties of an extended bulk glass. Instead, the thin intergranular glass film can be in a strained and chemically, structurally, or both, altered state by the adjacent grains so that it possesses very different properties, which can allow for a stronger interaction of the propagating crack with various glass-grain interfaces and with the glass film itself. Assuming that fracture energies for the aluminum titanate grain, the aluminum titanate interface, and the thin glass film are in a same range of magnitude, then the propagating microcrack encounters "energy-dissipating" interactions on its path, for example, by either creating further microcracking of aluminum titanate grains or debonding aluminum titanate-glass interfaces or splitting into several smaller microcracks that propagate along several intergranular films or crack deflection when encountering a high energy interface. FIG. 1F shows that the microcrack can be restricted to a long path within the same volume of the ceramic. Significantly more energy can be dissipated with such interaction of the crack with its surroundings compared to a single or straight crack so that the crack finally stops and does not lead to material failure. Although not bound by theory, FIGS. 1E and 1F illustrate what is believed to be the active toughening mechanism achieved by the incorporation of thin intergranular glass film into the disclosed ceramic articles and methods of making.

EXAMPLES

The following examples serve to more fully describe the manner of using the above-described disclosure, as well as to set forth the best modes contemplated for carrying out various aspects of the disclosure. It is understood that these examples do not limit the scope of this disclosure, but rather are presented for illustrative purposes. The working examples further describe how to prepare the porous articles of the disclosure.

Preparation of a green body. A green body can be prepared according to U.S. Pat. No. 5,332,703, entitled "Batch Compositions for Cordierite Ceramics," and U.S. Pat. No. 6,221,308, entitled "Method of Making Fired Bodies," both assigned to Corning, Inc., and as modified according to the present disclosure. Various glass forming additives, ceramic compositions, and the resulting microstructures and material properties, are described in the following examples and are organized by additive and additive addition, in the order of: $Li_2O$, phosphate, dipping in phosphoric acid, addition of excess silica, and lastly, the addition of $B_2O_3$.

Example 1

Addition of lithium oxide glass-forming additive to the batch. Separately batched compositions A, B, C having 0, 0.5 and 1% wt $Li_2O$ super-addition listed in Table 1 were ram-extruded into 1" diameter honeycomb with a 300/14 cell geometry. The inorganic raw materials, pore former, and binder were pre-mixed dry. The dry mixed ingredients were combined in a pan and mulled under addition of batch water until a suitable paste texture was reached. Lithium was added to the batch as dissolved lithium acetate in the batch water. Batch composition AA is another reference batch having a different pore former level as indicated in Table 1.

TABLE 1

Batch compositions with Li-addition.

| | Batch In wt. % | | | |
|---|---|---|---|---|
| | A | AA | B | C |
| INORGANICS | | | | |
| Silica | 10.19 | 10.19 | 10.19 | 10.19 |
| Strontium Carbonate | 8 | 8 | 8 | 8 |
| Calcium Carbonate | 1.38 | 1.38 | 1.38 | 1.38 |
| Titanium Dioxide | 29.95 | 29.95 | 29.95 | 29.95 |
| Hydrated Alumina | 3.71 | 3.71 | 3.71 | 3.71 |
| Lanthanum Oxide | 0.2 | 0.2 | 0.2 | 0.2 |
| Alumina | 45.57 | 45.57 | 45.57 | 45.57 |
| Solid inorganics totals | 100 | 100 | 100 | 100 |
| PORE FORMERS | | | | |
| Graphite | 10 | | 10 | 10 |
| Potato Starch | 8 | | 8 | 8 |
| Corn Starch | | 15 | | |
| SOLID BINDERS/ORGANICS | | | | |
| Methylcellulose | 4.5 | 4.5 | 4.5 | 4.5 |
| OTHER LIQUID ADDITIONS | | | | |
| Lithium Acetate in 20 mL water | 0 | 0 | 0.2 | 0.39 |
| Emulsion T | 16 | 16 | 16 | 16 |

The resulting paste was then extruded on a ram extruder into a honeycomb shape with a honeycomb die and shim of appropriate size. For 1" ram extruded parts, the die geometry was (300/14) with 300 cells per square inch and an extruded wall thickness of 14 mil.

The extruded green honeycomb parts were dried in a microwave oven at medium power for 5 minutes and then further dried in a drying oven for 24 h at 85° C. The parts were then fired in air in a CM furnace (cmfurnaces.com) using a ramp rate of 120° C/h, top temperature 1390, 1400, or 1410° C., and a hold time of 15 hr. All materials were extruded, dried, and fired without any crack formation failure problems.

Microstructure of fully fired materials containing Li glass forming additive. The fully fired materials B and C having 0.5 and 1% Li show typical feldspar, aluminum titanate, and alumina distribution, but are distinguished from Li-free A-material by the presence of very regularly distributed small size glass pockets with extended grain boundary glass film. The reference material A contains occasional glass pockets that are large and not well distributed. The microcracks appear to run through the aluminum titanate phase with Li-glass pockets present. In the reference Li-free material A, cracks easily propagate through the feldspar phase. In the Li-containing sample, the microcracks are smaller, are less frequently observed in feldspar areas and seem to be stopped at the feldspar interfaces and do not propagate through the entire material.

Electron back-scattered diffraction (EBSD) with a domain size analysis (mis-orientation greater than 15 degrees as distinction criterion for different domains) and grain size analysis (mis-orientation greater than 1 degree as distinction criterion for different grains) showed that the average aluminum titanate grain size is 10 micrometers and the average domain size about 40 micrometers for the material with 1% Li. No particular texturing was observed in the pole figure of aluminum titanate. The microstructural characteristics of aluminum titanate in materials derived from Li-containing batches are very similar to the reference material. The aluminum titanate grain size is not larger despite the glass flux.

FIGS. 2A to 2D show SEM images (electron backscattered diffraction) of a polished cross section of an exemplary ceramic material having lithium sourced thin intergranular glass; specifically the above experimental C-material containing 1% Li.

Figure 2A:
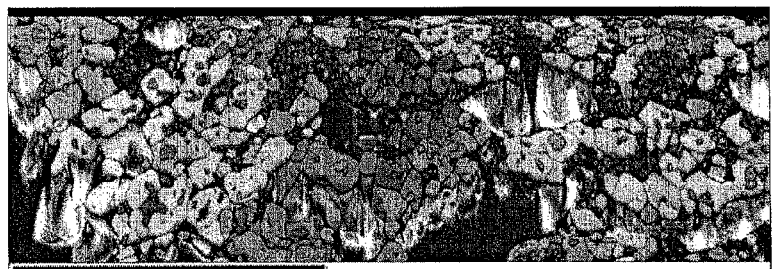
FIGS. 2A to 2D show SEM images of a polished cross section of an exemplary ceramic material having lithium sourced intergranular glass.

FIG. 2A is a band contrast image showing the typical grain size distribution; the grains appear in different grey level and are separated by a dark contrast line that indicate the grain boundary or interface location. The bar scale at the bottom of each image corresponds to 100 micrometers.

Figure 2B:
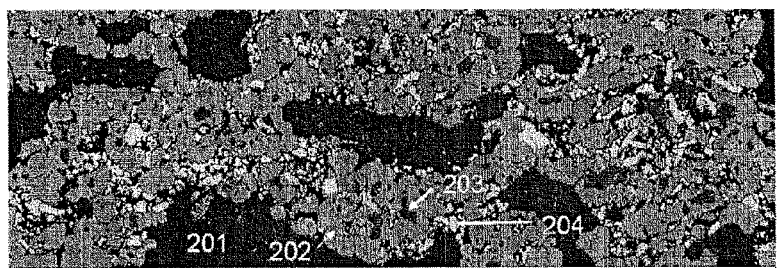

FIG. 2B is a phase contrast image at high magnification with the phases indicated in different grey levels; pores (201) are black, aluminum titanate (202) is intermediate grey, alumina (203) is dark grey, feldspar (204) is light grey.

Figure 2C:
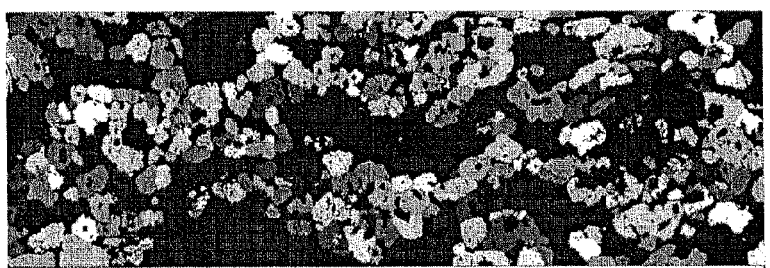

FIG. 2C shows only the aluminum titanate grains with a separation of the individual grains by an arbitrarily chosen grey level. A 1.5 degree c-axis mis-orientation was chosen as a distinction criterion between different grains.

Figure 2D:
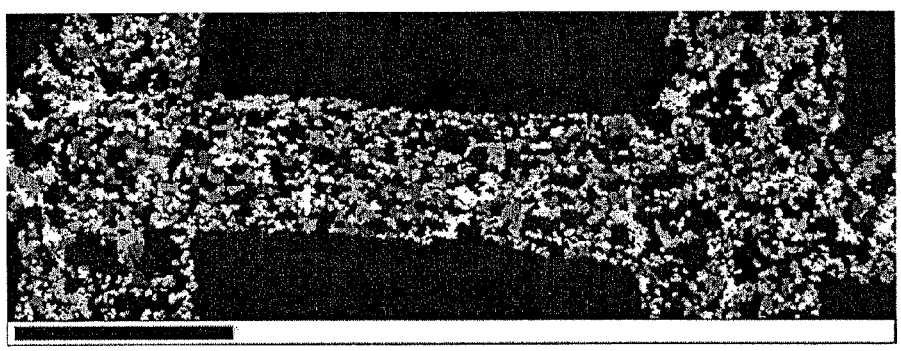

FIG. 2D shows a larger area and represents only the aluminum titanate phase with a separation of individual domains by an arbitrarily chosen grey level. A 15 degree c-axis mis-orientation was chosen as distinction criterion between different domains The black scale bar at the bottom of the images corresponds to 500 micrometers.

Figure 3A:
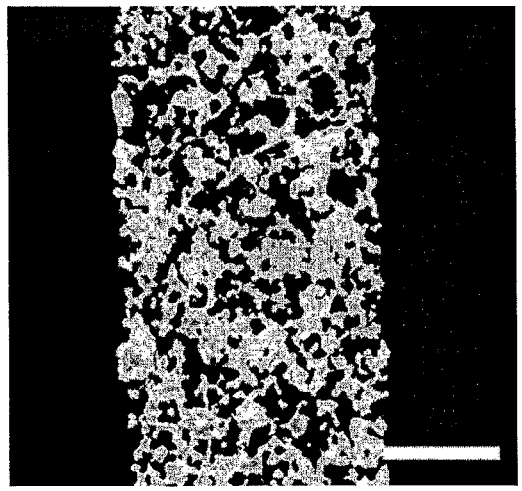
FIGS. 3A to 3D show SEM images at two different magnifications of polished cross sections of ceramic materials that are free of lithium (FIGS. 3A and 3B) and have lithium sourced intergranular glass (FIGS. 3C and 3D).
Figure 3B:
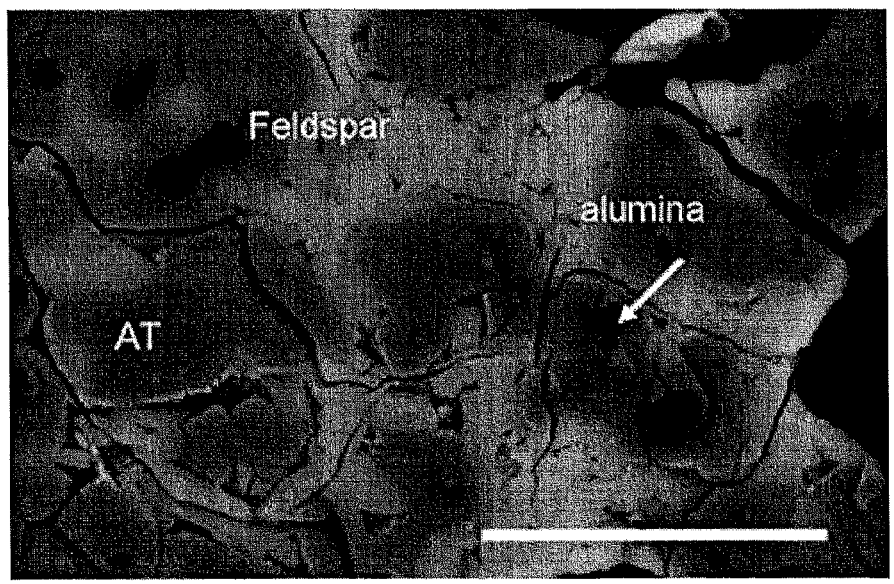

FIGS. 3A and 3B shows SEM images at different magnifications of polished cross sections of fired ceramic lithium-free materials A. FIG. 3A shows the pore structure (the bar scale is 200 micrometers). In FIG. 3B the phase distribution is shown with pores being black regions, aluminum titanate being grey, alumina being dark grey, feldspar being light grey, and the microcracks being black wavy lines that clearly propagate through aluminum titanate grains and also through the feldspar.

Figure 3C:
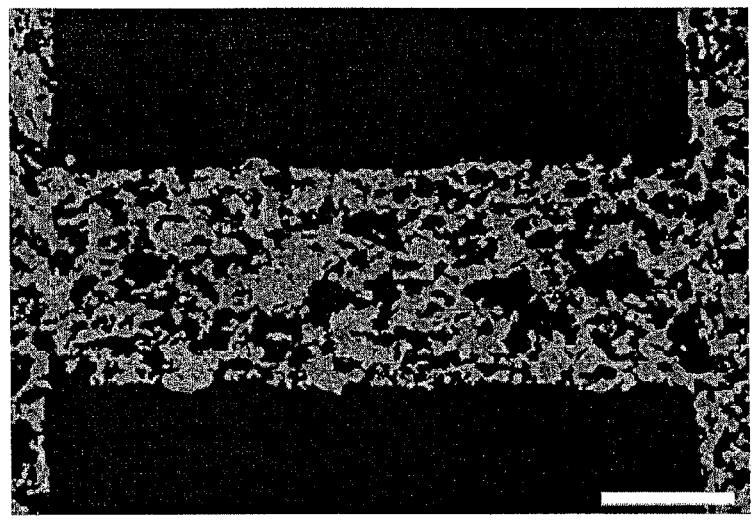
Figure 3D:

FIGS. 3C and 3D show the material B having 0.5% lithium oxide in the batch after firing at 1410 C. FIG. 3C shows the pore structure (the bar scale is 200 micrometers). FIG. 3D shows the phase distribution with pore being black, aluminum titanate being mid-grey, alumina being dark grey, feldspar being light grey with small glass-filled grain junctions, and the microcracks being black wavy lines that propagate preferentially through the aluminum titanate grains and the intergranular glass film.

The distribution of pores in the materials with lithium is very similar to that of the lithium-free material, Figs A and C. Differences are visible in the phase distribution in FIGS. 3B and 3D; the glass pockets in the lithium-free material are much larger in size than in the lithium containing material. Extension of the fine glass pockets in the lithium containing materials along the grain boundaries can be seen. Microcracks in the lithium-free material are very large and cross without preference feldspar and aluminum titanate grains. In the lithium-containing material, statistics show much finer cracks and also indicate that the cracks preferentially propagate through aluminum titanate grains and interfaces and not through bulk feldspar grains.

XRD of the fully fired (1410° C., 15 h) materials with Li do not show any additional crystalline phases besides aluminum titanate, Sr-feldspar, unreacted excess alumina, and traces of rutile. The phase fractions are also similar to that in Li-free batches. Firing at top temperature 1400° C. for 15 h resulted in the same phase composition, demonstrating the possibility of firing the materials with additives at lower temperatures. XRD (not provided here in a detailed listing) of fully fired material C containing 1% Li after firing at top temperature 1410° C. for 15 h and material B containing 0.5% Li after firing at top temperature 1410° C. for 15 h/1410° C./15 h firing at top temperature 1400° C. for 15 h (4 C), respectively, confirms that full conversion into the final product was reached in all cases. XRD shows aluminum titanate and strontium feldspar as main phases and only typical minor levels of alumina and titania. Even at the lower firing temperature of 1400° C., material C reaches the full conversion and phase composition that is achieved for the lithium-free material only after firing of at least 15° C. higher temperature.

Physical properties. Physical properties of fired ware without any $Li_2O$ addition (material A), with 0.5% (material B), and 1% wt $Li_2O$ (material C) are listed in Table 2.

TABLE 2

| Fired 1410° C./ 15 hrs | % porosity | d50 (microns) | (d50 − d10)/d50 | CTE (RT to 1000° C.) | fully fired MOR (psi) |
|---|---|---|---|---|---|
| Material A without Li | 49.5 | 15.4 | 0.52 | 4.3 | 250-280 |
| Material B with 0.5% Li | 50.34 | 15.7 | 0.42 | 3 | 322 |
| Material C with 1% Li | 50.15 | 16.7 | 0.36 | 3.3 | 333 |

Figure 4:
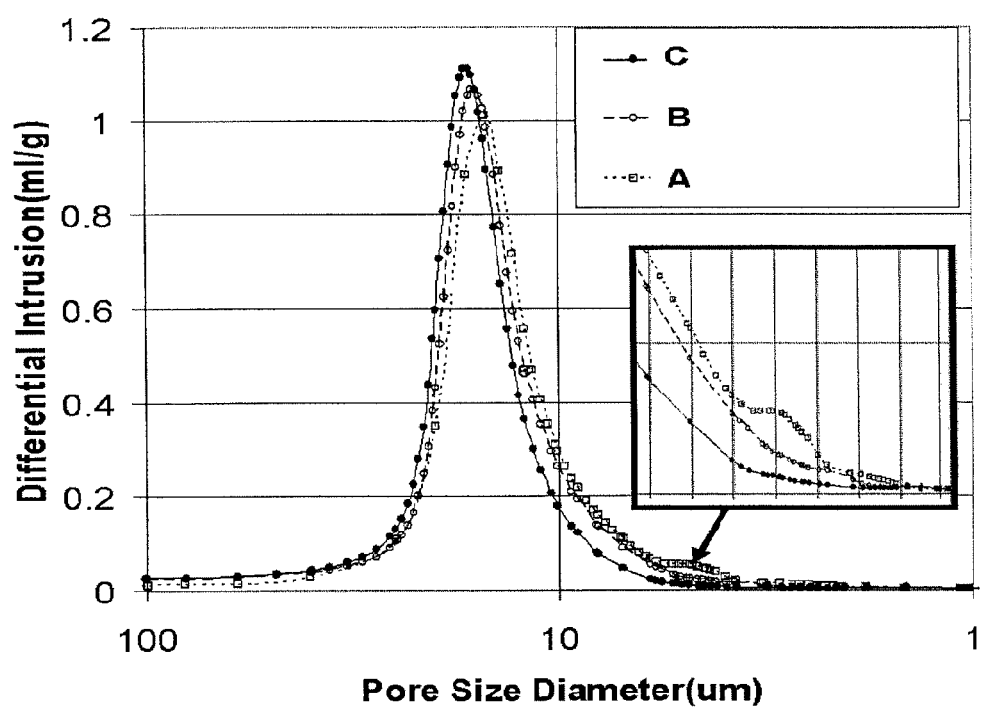
FIG. 4 shows pore size distributions for materials A (control), B, and C having, respectively, 0%, 0.5%, and 1 wt % Li-source addition.

Porosity. The ware made from the Li-containing batches demonstrates advantages in its porosity compared to the Li-free reference batch, see FIG. 4. FIG. 4 shows comparable pore size distributions for materials A, B, and C having, respectively, 0%, 0.5%, and 1% Li-addition. The insert shows the Li-free material A having a slightly enlarged (shoulder) small pore size content compared to materials obtained from lithium-sourced material batches B and C. The overall porosity is very similar, but the medium pore size increases with increasing Li-content and the d-factor decreases with increasing Li-content. Details of the pore size distribution, as shown in the inlet of FIG. 4, show that fine porosity with d<5 micrometers is almost completely suppressed in the batch with 1% Li-addition and that porosity with d<10 micrometers is about half of that in a Li-free batch. The pore size distribution is narrower for material made from Li-containing batches, indicating a lower pressure drop for the more homogeneous pore size.

Figure 5A:
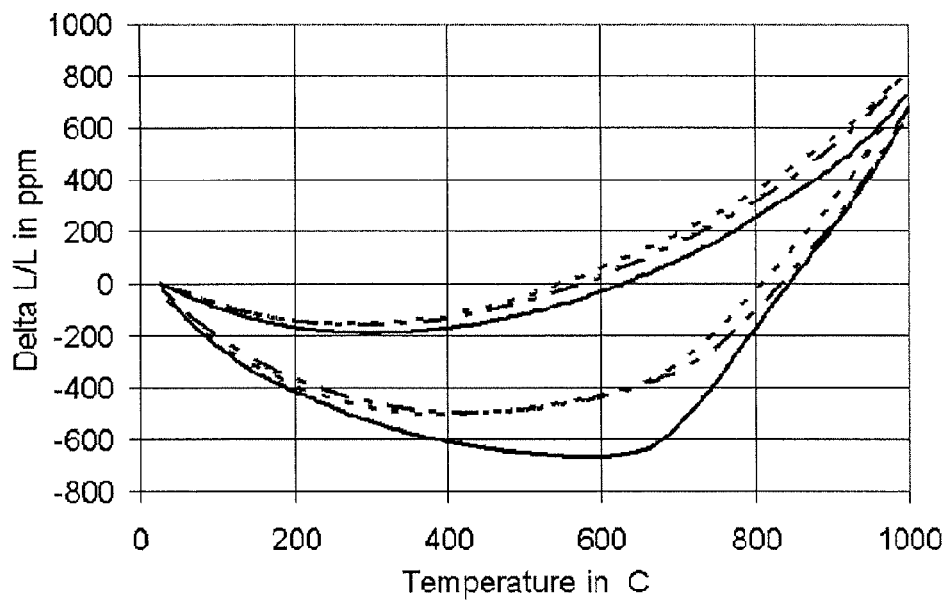
FIGS. 5A and 5B show thermal expansion curves for fired ceramic materials without and with a lithium-source in the batch.

Thermal Expansion. The thermal expansion behavior of the B-material batch containing 0.5% Li is unmodified compared to the Li-free reference A-material. The C-material containing 1% Li shows a slightly enhanced hysteresis upon thermal cycling. Details are shown in FIG. 5A. The CTE in the range from room temperature to 800° C. is lower for the batches containing Li, 3.3 and $3 \times 10^{-7} K^{-1}$, respectively, compared to the Li-free reference batch with $4.6 \times 10^{-7} K^{-1}$. The stability upon thermal cycling is a general concern for batches and needs to be addressed in the presence of additives that may form glasses that can recrystallize during further heat treatment(s). To test the stability of the material upon cycling, the material with 1% Li was extensively cycled and then the CTE remeasured, FIG. 5B. The hysteresis decreased upon cycling, the overall CTE increased slightly to $4.7 \times 10^{-7} K^{-1}$, indicating that glass pockets partially crystallize during the heat treatment. A variation in CTE of $1 \times 10^{-7} K^{-1}$ is within the typical variation of standard materials.

Figure 5B:
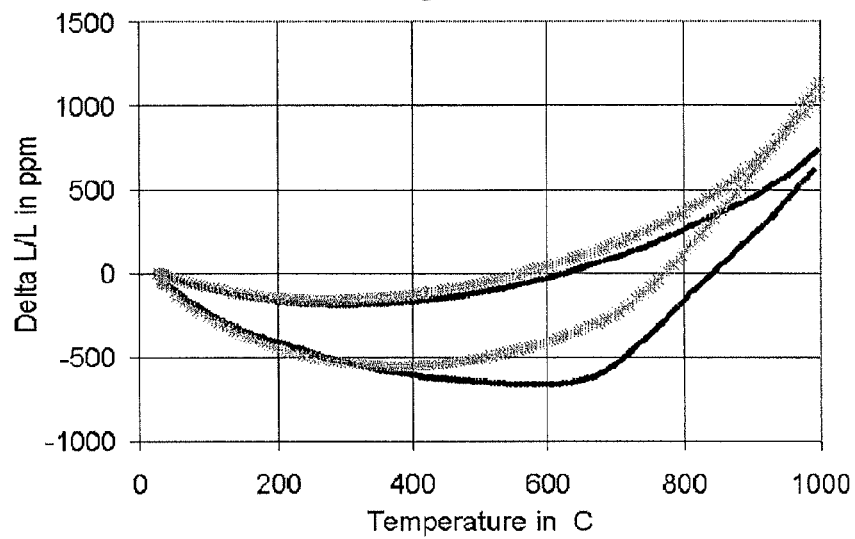

FIGS. 5A and 5B show thermal expansion curves for flux-free reference material A and materials B and C made from batches having 0.5% and 1% wt Li: initial cycle (5A) and after five (5) temperature cycles (5B), respectively. FIG. 5A shows thermal expansion curves during heating from room temperature to 1000° C. and subsequent cooling back to room temperature for Li-free reference material A (alternating short and long dashed lines) and material B (short dashed lines) and material C (solid lines) made from batches having 0.5% and 1% lithium oxide source, respectively. The set of upper lines having a higher CTE correspond to the cooling curve. The lower lines correspond to the heating curve. FIG. 5B compared the thermal expansion curves during heating and cooling for material C as-fired (continuous lines) and after thermal cycling (crossed hatched grey lines). The set of upper lines with higher CTE correspond to the cooling curve, and the lower lines to the heating curve.

Elastic modulus. The elastic modulus and its hysteresis in response to thermal cycling show differences compared to Li-free material. To ensure that those differences are not due to slight difference in porosity, the measured data are shown together with data normalized on cell geometry and porosity. Another standard material with very different porosity was added to the graph to show that this correction effectively corrects for cell geometry and porosity differences, since the two standard materials in their extrapolation to dense material show no difference. The Li-containing material, however, shows higher E-mod values and a larger hysteresis. Compared to other examples where simply higher microcrack density in the material leads to a larger hysteresis, a major difference of the hysteresis of widened temperature is noted. While the top E-mod values of standard and 0.5% Li containing materials are the same, the hysteresis for the 0.5% Li containing material is wider in temperature. The extension of the hysteresis at high temperature suggests that complete microcrack healing requires higher temperatures than in the reference material. This can be explained by, for example, interactions of microcracks with the glass phase, glass phase penetration into the cracks, and inhibition or slowing of closure. The 1% Li material shows the same features, together with an increase in microcrack density.

Figure 6A:
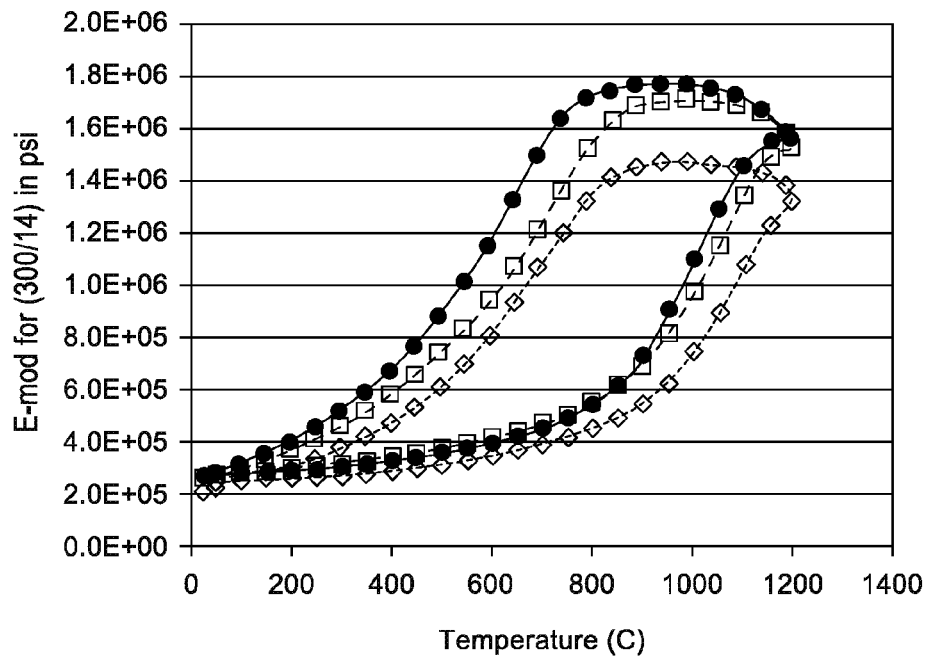
FIGS. 6A and 6B show examples of fired ceramic elastic modulus hysteresis upon thermal cycling.
Figure 6B:
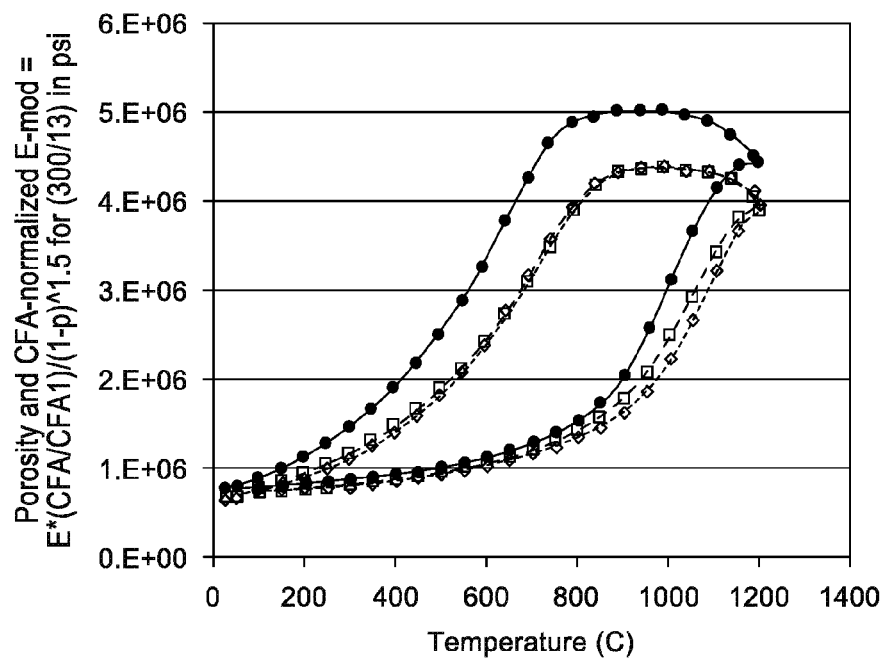

FIGS. 6A and 6B show elastic modulus hysteresis upon thermal cycling where the lower lines correspond to the heating curves, and the upper lines correspond to the cooling curves. FIG. 6A shows the elastic modulus upon thermal cycling for the lithium-free reference material A (squares), material AA (diamonds) having different porosity levels, and material C (dots) made from a batch having 1% Li. FIG. 6B shows the a density-normalized elastic modulus (i.e., elastic modulus divided by material relative density) upon thermal cycling for lithium-free reference material A (squares), material AA (diamonds) having different porosity levels, and material C (dots) made from a batch having 1 wt % Li. The results indicate that the curves for the lithium free material has curves which overlap and are different from the lithium containing materials.

Material strength. Based on the above information that the number of microcracks appears to be increased, but their length confined to the aluminum titanate agglomerates, and that Li-containing material has the same porosity as Li-free material and a slightly larger pore size, a direct comparison of modulus of rupture (MOR) as determined by flexure tests can be made. The comparison indicates that the material strength increases with increasing Li-content from the standard Li-free material A with about 260 psi to 320 psi for material B with 0.5% Li and to 330 psi for material C made with 1% Li. This is a significant increase in MOR of more than 25% for a minor modification in chemical composition.

Conclusion on Li-oxide sinter additive. Since all other physical properties of the material have been slightly improved in presence of small amounts of Li, the strength improvement at such very low additive levels and the suggestion of a lower firing temperature than reference material A provide a significant advantage for an improvement of known aluminum titanate-feldspar composites, since it provides a path to make higher porosity, thinner wall, diesel particulate filters with significantly higher strength. Additionally or alternatively, the addition of lithium oxide permits a reduction in either the length of the firing cycle or the top firing temperature.

Example 2

Phosphorous oxide glass-former. Since phosphorous oxide is known to promote glass formation in various oxides, AT-type batches with phosphorous oxide levels from 1 to 5% were made. Phosphorous oxide was added to the batch in form of aluminum phosphate. Batch compositions are summarized in the Table 3.

TABLE 3

Phosphorous oxide containing batch compositions

| | Batch (wt %) | | | |
|---|---|---|---|---|
| | A | D | E | F |
| INORGANICS | | | | |
| Silica | 10.19 | 10.19 | 10.19 | 10.19 |
| Strontium Carbonate | 8 | 8 | 8 | 8 |
| Calcium Carbonate | 1.38 | 1.38 | 1.38 | 1.38 |
| Titanium Dioxide | 29.95 | 29.95 | 29.95 | 29.95 |
| Hydrated Alumina | 3.71 | 3.71 | 3.71 | 3.71 |
| Lanthanum Oxide | 0.2 | 0.2 | 0.2 | 0.2 |
| Alumina | 46.57 | 46 | 45.57 | 44.57 |
| Aluminum Phosphate (purity 95%) | 0 | 1 | 2.3 | 4.7 |
| Totals | 100 | 100.43 | 101.3 | 102.7 |
| PORE FORMERS | | | | |
| Graphite | 10 | 10 | 10 | 10 |
| Potato Starch | 8 | 8 | 8 | 8 |
| SOLID BINDERS/ORGANICS | | | | |
| Methylcellulose | 4.5 | 4.5 | 4.5 | 4.5 |
| OTHER LIQUID ADDITIONS | | | | |
| Emulsion T | 16 | 16 | 16 | 16 |

The fully fired alumina titanate materials with 1 to 4.7% $AlPO_4$, materials D to F, show the same feldspar, aluminum titanate, and alumina distribution as the phosphorus-free material A, but are distinguished from it by the presence of glass pockets. At high phosphate levels, the resulting microstructure is completely altered. The phosphorus is incorporated into the feldspar under formation of mixed silicate-phosphate feldspar. Some aluminum titanate phase is dissolved in the phosphorous-containing glass. Exchange reactions, as visible in the SEM images of the materials by a change in contrast, have occurred at the borders of both the aluminum titanate grains and the feldspar grains. Microcracks preferentially follow the aluminum titanate grain interfaces and do cross, with less probability, the aluminum titanate and the feldspar bulk grains. As the phosphate content increases, both the microcrack size, and the level of unreacted alumina increase. Samples having higher levels of phosphate show varying levels of residual glass depending on their cooling, post-annealing cycles, or both. In samples with low levels of phosphorus, the low melting glass distributes uniformly across the microstructure, penetrates the pores, and promotes the sintering and disappearance of small pores. This results in a narrower pore size distribution and a larger medium pore size.

Figure 7A:
FIGS. 7A to 7C show composited SEM micrographs of three fired ceramic samples at three different magnification levels (left to right) that were prepared with increasing levels of aluminum-source (aluminum phosphate) additive.
Figure 7B:
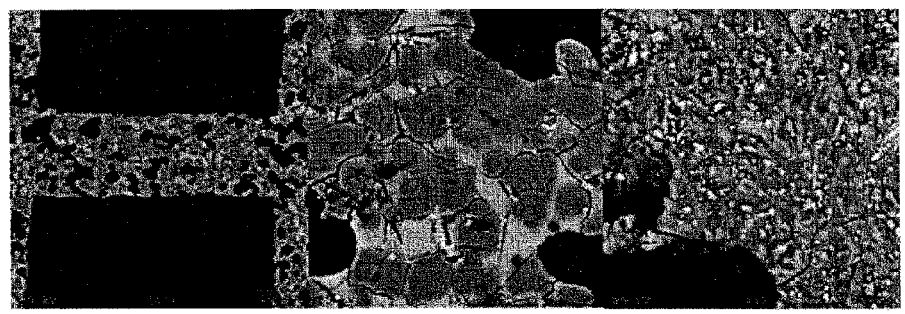
Figure 7C:
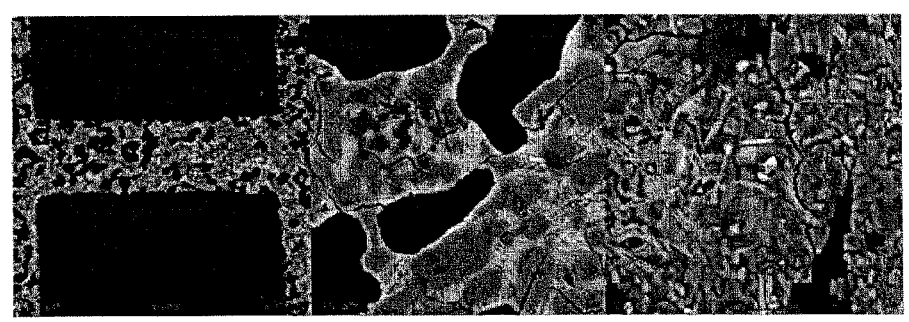

FIGS. 7A to 7C, respectively, show composited SEM micrographs as polished cross-sections of three fired ceramic samples of batches D, E, and F, having three levels of magnification (left=low, middle=medium, right=high) and having an increasing amount of added aluminum phosphate, respectively: 1% (FIG. 7A), 3% (FIG. 7B), and 5% (FIG. 7C). While the lowest level of phosphorus addition, FIG. 7A, does not induce any major modification in the material microstructure compared to P-free material A and excels only by thin intergranular glass films and small glass pockets, the materials with higher phosphorus level in FIGS. 7B and 7C reflect strong modifications in their microstructure with rounded aluminum titanate grains that have partially dissolved in the glass and a reacted feldspar that has incorporated high levels of phosphorus and surrounds the aluminum titanate grains like a liquid or glassy matrix material that recrystallized upon cooling. Extended phosphorus inter-diffusion zones can be noticed at the grain boundaries and interfaces, where phosphorus was more slowly incorporated into the bulk grains. The low magnification visualizes the pore size distribution (left) and at higher magnification (middle and right) visualizes the phase distribution.

Differential scanning calorimetry (DSC) shows a melting event upon heating and recrystallization upon cooling which both reflect the presence of the glass phase. The glass in presence also decreases the final melting of the composite from greater than 1440° C. to about 1380° C., as shown by the DSC of green ware containing $AlPO_4$. Melting of the glass phase occurs at 1320° C. for 4.7 wt. % $AlPO_4$ addition and is visible as an additional endothermic event in the heating DSC; the cooling DSC from top firing temperature to room temperature shows a small exotherm that is related to the crystallization of the glass. The crystallization is faster in presence of larger phosphorus levels. During its melting, the glass wets grain boundaries and penetrates easily into small pores where it promotes sintering and loss of fine size porosity.

Figure 8A:
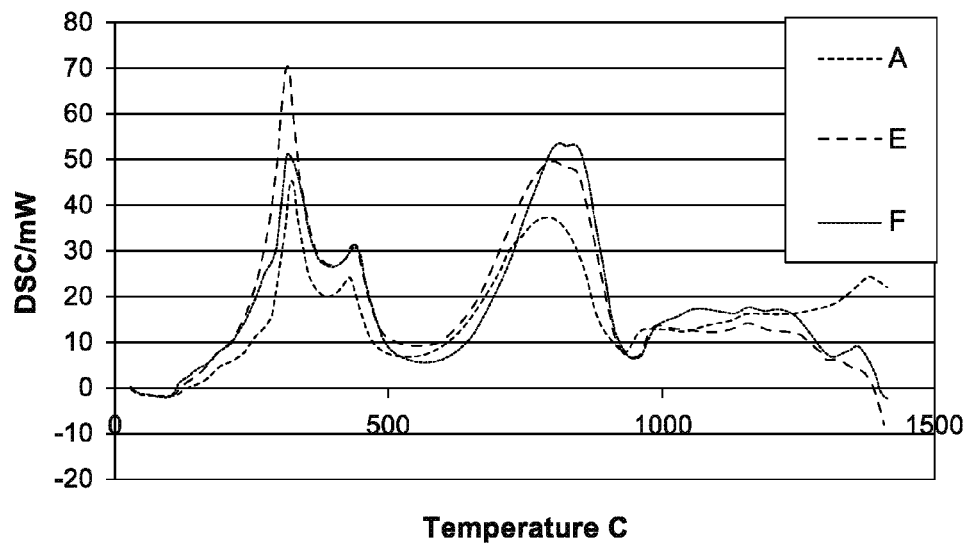
FIGS. 8A and 8B show differential scanning calorimetry results for selected fired ceramic materials.
Figure 8B:
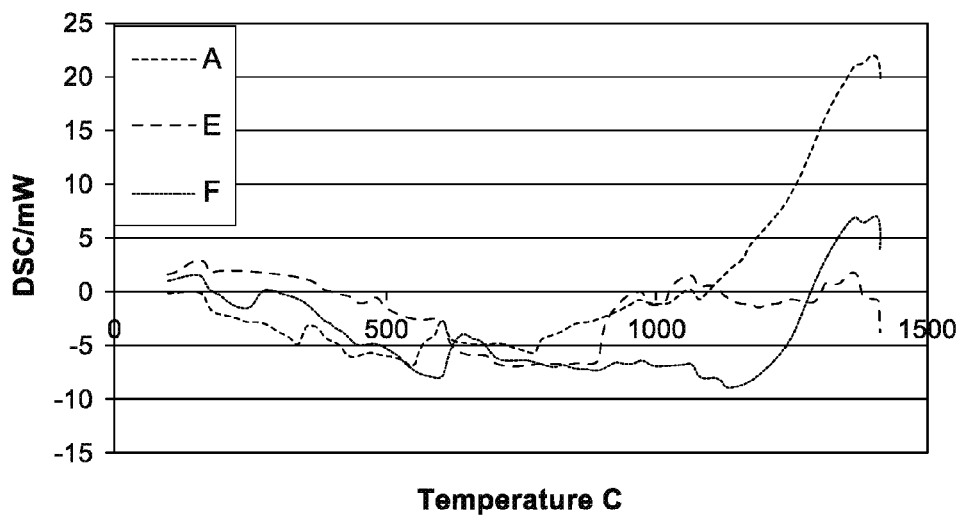

FIGS. 8A and 8B show the differential scanning calorimetry results for selected fired materials A, D, and E. FIG. 8A shows the heating curves with glass melting events that are visible as exotherms above 1200° C. for curves of materials E and F and are not visible for the reference material A without phosphorus. FIG. 8B shows the cooling curves of materials A, E and F with glass crystallization occurring in materials E and F as an endothermic event upon cooling around 1100° C. The P-free material A does not show such an endothermic event upon cooling. FIG. 8A shows the typical characteristics of the formation of a glass phase that melts and recrystallizes upon cooling.

XRD measurements of the fully fired (1410° C., 15 hr) samples with $AlPO_4$ did not show any additional crystalline phases besides aluminum titanate, alumina phosphate, Sr-feldspar, unreacted excess alumina, and traces of rutile. The feldspar phase is modified from a triclinic structure to a monoclinic structure. Glass levels are low and not visible in the XRD.

Physical properties of fired ware A without any $AlPO_4$ addition and materials D, E, F with 1 to 4.7% $AlPO_4$ super-addition of phosphate are compared in Table 4.

TABLE 4

| Fired at 1410° C./15 hrs. | Porosity in % | $d_{50}$ in microns | d-factor | CTERT-1000° C. in $10^{-7}$ $K^{-1}$ | MOR in psi |
|---|---|---|---|---|---|
| A | 51.2 | 14.7 | 0.46 | 4.6 | 263 |
| D - 1% $AlPO_4$ | 46.8 | 18.6 | 0.28 | 8.5 | 352 |
| E - 2.3% $AlPO_4$ | 41.7 | 21.3 | 0.26 | 0.7 | 315 |
| F - 4.7% $AlPO_4$ | 30.6 | 22.5 | 0.29 | −1.2 | 384 |

Ware made from batches containing $AlPO_4$ demonstrates a medium pore size increase with increasing $AlPO_4$-content and decreasing width of the pore size distribution with increasing $AlPO_4$ content. Details of the pore size distribution show that the fine porosity with diameter less than 7 micrometers is almost completely missing in batches with $AlPO_4$. Larger medium pore size and narrower pore size distribution promote a lower pressure drop of the DPF.

Figure 9A:
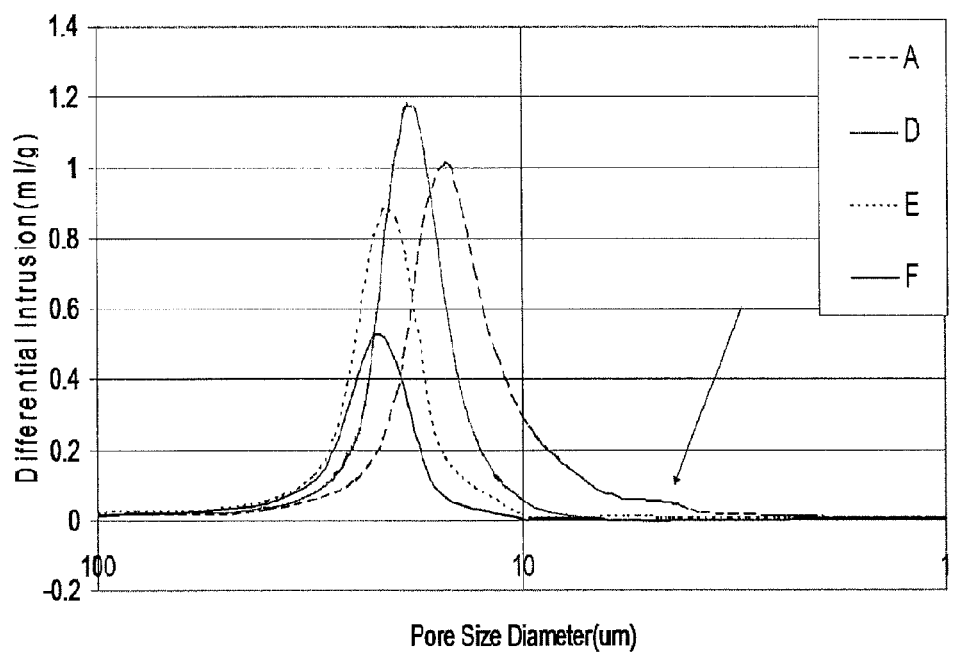
FIGS. 9A and 9B show aspects of the pore size distribution properties of fired ceramic samples made from batches having different levels of phosphorous-source addition.
Figure 9B:
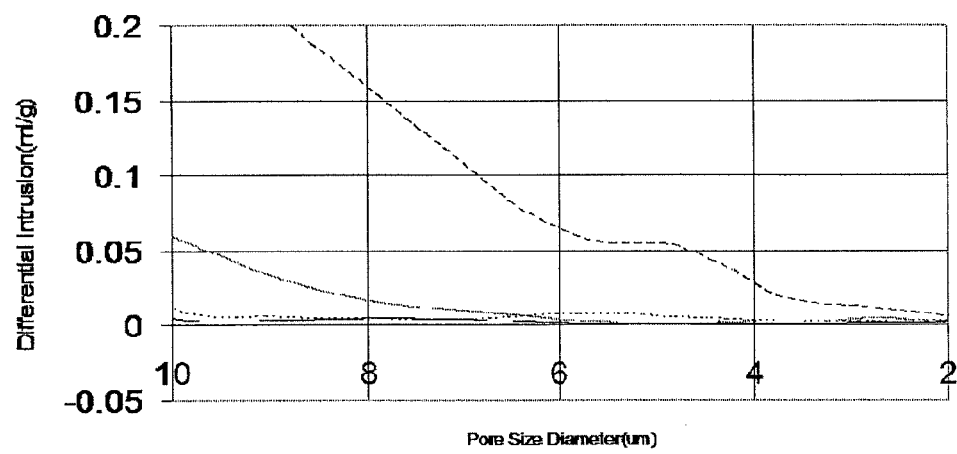

FIG. 9A shows the pore size distribution properties of fired samples A, D, E, and F, made from batches having different levels of phosphorous-source addition. The medium pore size has significantly increased with increasing phosphorus level (maximum shifted to larger size) compared to phosphorus-free material A. FIG. 9B shows an expanded view of the small pore region (arrow) of FIG. 9A illustrating a shoulder region having preserved a higher small pore size content in material A (control, 0% aluminum phosphate) compared to the P-containing materials D, E, and F that have lost their small pores through more effective sintering in the presence of the phosphorus glass phase.

Figure 10:
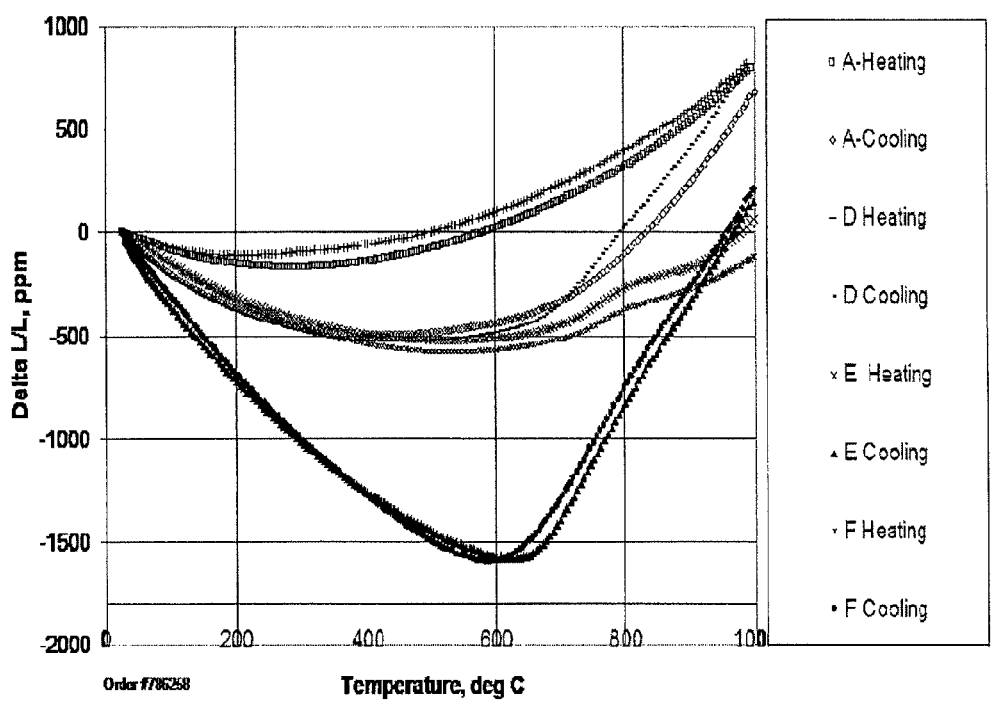
FIG. 10 shows thermal expansion curves for fired ceramic samples from batches A, D, E, and F having different levels of phosphate-source addition.

FIG. 10 shows thermal expansion curves for samples derived from batches A, D, E, and F of Table 4 having different levels of phosphate addition. The thermal expansion behavior of the sample made from a batch containing 1% $AlPO_4$ is unchanged compared to the $AlPO_4$-free reference batch. Samples with higher $AlPO_4$-levels have a smaller global expansion between room temperature and 800° C., but also have larger hysteresis. In addition they reflect a discontinuity in the curves that is due to a phase transformation of the mixed phospho-silicate-feldspar phase with temperature. Although not bound by theory the larger microcracks are likely responsible for the larger hysteresis.

As-measured MOR is presented in property Table 6. However, due to changes in porosity and $d_{50}$, the porosity-normalized MOR provides more insight and shows a 23% increase in porosity-normalized strength for addition of 1% $AlPO_4$, while higher levels of phosphate reverse this benefit due to the strong modifications of the feldspar and aluminum titanate phases, and the large amount of glass. Porosity and pore size-normalized MOR (measured MOR normalized on material density and pore size) shows a doubling in strength.

It can be concluded that a small amount of alumina phosphate, such as about 1% weight, can increase the strength of an AT-type material by as much as 34% and can have a negligible impact on CTE. Formation of small amounts of phosphorous-containing glass causes only a small loss of the overall porosity, eliminates the small-size pores, and decreases the width of the pore size distribution. The modified pore structure can be expected to yield a lower pressure drop. The uniform distribution of the phosphorous-containing glass along grain boundaries and interfaces promotes crack propagation along the glass film and promotes crack deflection, interface debonding, and crack multiplication within the glass, so that a stronger material is obtained (as demonstrated by the higher MOR). However, the amount of glass has to be low. High levels of aluminum phosphate addition yield formation of high quantities of glass phase and mixed feldspar and do not provide the thin grain boundary glass layers as a preferred crack propagation path and result in lower material strength.

Example 3

Glass formation by dipping fully fired honeycomb in phosphoric acid. A, G, and H fully fired parts were dipped into phosphoric acid (10% wt. aqueous solution) and then annealed (1400° C.). These batch compositions are listed in the Table 5.

The $H_3PO_4$-dipped and fired parts show a decrease in porosity with an elimination of fine pores and narrowing of the pore size distribution compared to the original ware. The dipping results also in shrinkage of the parts, e.g., 8.5% in diameter and 5.3% in length. A strong decrease in porosity was observed for high porosity parts G and H, while lower porosity A parts almost preserved their porosity. MOR increased in all cases, for G, H, and A by 51%, 97%, and 29%, respectively. Normalization on porosity provided an increase of porosity-normalized MOR by 7%, 35%, and 28%, respectively.

Table 6 summarizes the properties of as-fired ware A, G, and H, and the same fired ware that was dipped ("-d") in phosphoric acid and then annealed A-d, G-d, and H-d.

TABLE 6

| Ware | Treatment Conditions | MOR in psi | CTE (RT to 1000° C.) in $10^{-7} K^{-1}$ | porosity in % | d50 in micrometers | (d50 − d10)/d50 | Permeability | MOR/(1 − porosity) in psi |
|---|---|---|---|---|---|---|---|---|
| G | fired at 1410° C. | 310 | 8.4 | 61.7 | 14 | 0.53 | 532 | 810 |
| G-d | dipped in 10% $H_3PO_4$ | 467 | 7.6 | 46.1 | 17.4 | 0.28 | 702 | 867 |
| H | fired at 1410° C. | 220 | 4.5 | 61.1 | 17.4 | 0.51 | 832 | 565 |
| H-d | dipped in 10% $H_3PO_4$ | 434 | 3.1 | 42.9 | 20.0 | 0.24 | 934 | 760 |
| A | fired at 1410° C. | 216 | 3.4 | 48.3 | 15.8 | 0.41 | 549 | 418 |
| A-d | dipped in 10% $H_3PO_4$ | 279 | 9.1 | 48.0 | 16.8 | 0.32 | 671 | 536 |

TABLE 5

Batch compositions of materials used for the phosphoric acid dipping.

| | Batch (wt %) | | |
|---|---|---|---|
| | A | G | H |
| INORGANICS | | | |
| Silica | 10.19 | 8.75 | 8.75 |
| Strontium Carbonate | 8 | 8 | 8 |
| Calcium Carbonate | 1.38 | 1.38 | 1.38 |
| Titanium Dioxide | 29.95 | 29.95 | 29.95 |
| Hydrated Alumina | 3.71 | 3.71 | 3.71 |
| Lanthanum Oxide | 0.2 | 0.2 | 0.2 |
| Particulate alumina | 46.57 | — | — |
| Fibrous alumina | — | 58.01 | 48.01 |
| Total | 100 | 100 | 100 |
| PORE FORMERS | | | |
| Graphite | 10 | | |
| Potato Starch | 8 | 20 | 20 |
| SOLID BINDERS/ORGANICS | | | |
| Methylcellulose | 4.5 | 6.5 | 6.5 |
| OTHER LIQUID ADDITIONS | | | |
| Emulsion T | 16 | 20 | 20 |

Figure 11A:
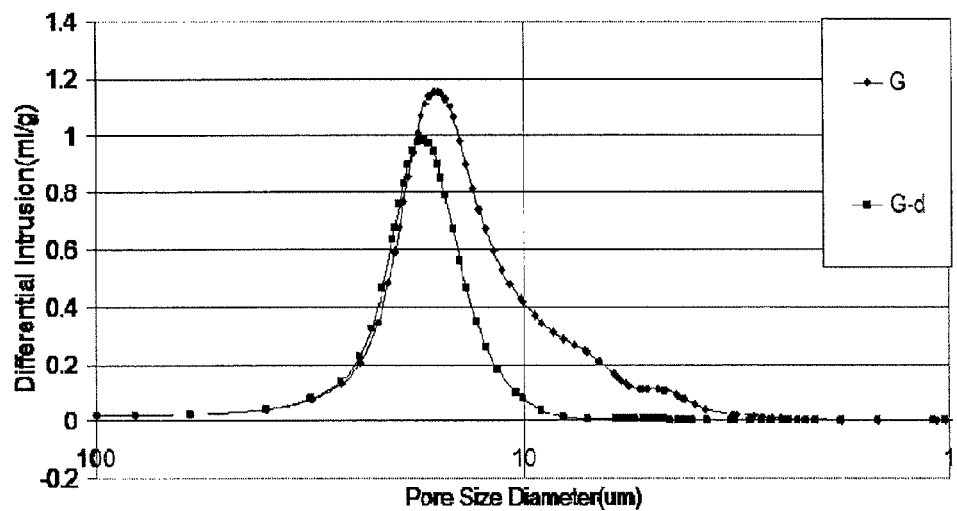
FIGS. 11A to 11 C show pore size distributions for fired ceramic samples before and after $H_3PO_4$ dipping, then annealing.
Figure 11B:
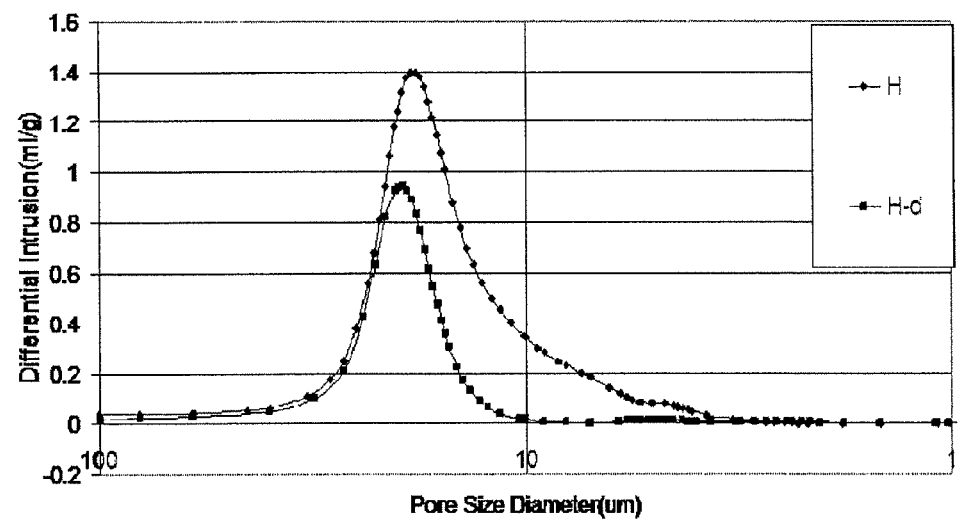
Figure 11C:
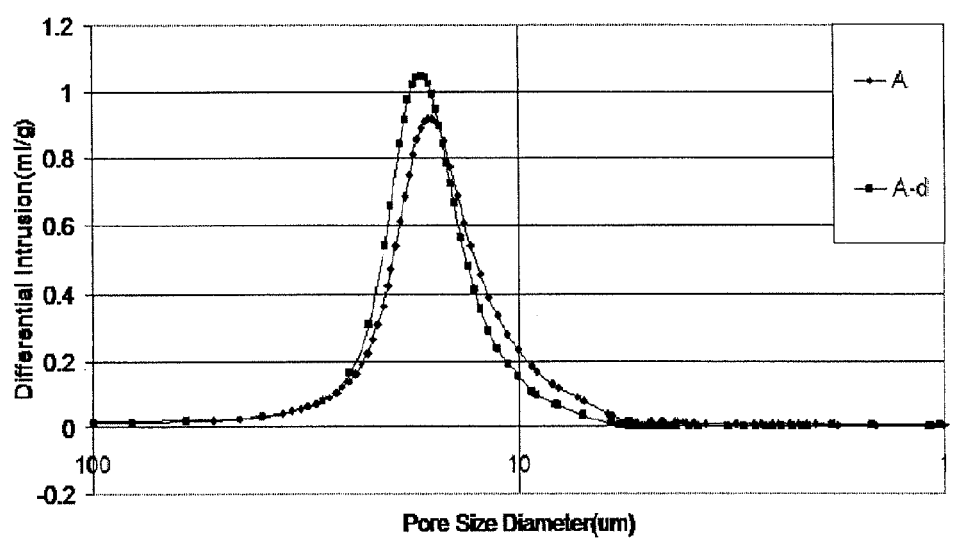

FIGS. 11A to 11C show pore size distributions for fired samples G (11A), H (11B), and A (11C), respectively, prior to dipping (diamonds) and after dipping (squares) ("-d" suffix) the fired samples in $H_3PO_4$, and then annealing.

FIG. 11A shows the pore size distribution of for as-fired material G and material G-d that was obtained by dipping fired material G in 10% $H_3PO_4$ and annealing it at 1400° C. The pore size distribution of this high porosity material after dipping and annealing is much narrower, all pores with diameter smaller than 10 micrometer in the mercury porosimetry measurement have completely disappeared and the medium pore size has been increased.

FIG. 11B shows the pore size distribution for as-fired material H and material H-d that was obtained by dipping fired material G in 10% $H_3PO_4$ and annealing it at 1400° C. The pore size distribution of this high porosity material after dipping and annealing is much narrower, all pores with diameter smaller than 10 micrometer in the mercury porosimetry measurement have completely disappeared and the medium pore size has been increased.

FIG. 11C shows the pore size distribution of for as-fired material A and material A-d that was obtained by dipping fired material G in 10% $H_3PO_4$ and annealing it at 1400° C. Even though the pore size distribution is still narrower after dipping and annealing, the effect is less pronounced for this lower porosity material than for materials G and H.

XRD results (not shown) of A-d, G-d, and H-d, i.e., after dipping the fired samples A, G, and H into 10% phosphoric acid and annealing them at 1400° C., still show aluminum titanate and feldspar as main phases, but indicate a change in the symmetry of the feldspar phase from triclinic to monoclinic.

TABLE 7

| Extrusion Sample | Aluminum titanate | Alumina | Rutile | Feldspar | XRD feldspar type | Aluminum phosphate | Calc. alumina-phosphate |
|---|---|---|---|---|---|---|---|
| G | 65.4 | 13.6 | 1.3 | 19.7 | triclinic | — | — |
| G-d | 66.4 | 15 | 1.1 | 15.9 | monoclinic | 1.7 | 5.7 |
| H | 74.3 | 4.2 | 0 | 21.1 | triclinic | — | — |
| H-d | 75.1 | 5.4 | 0 | 17.6 | monoclinic | 1.4 | 6.4 |
| A | 72.2 | 5.8 | 0.5 | 21.6 | triclinic | — | — |
| A-d | 74.6 | 7.4 | 0 | 15.5 | monoclinic | 1.9 | 3.8 |

Figure 12A:
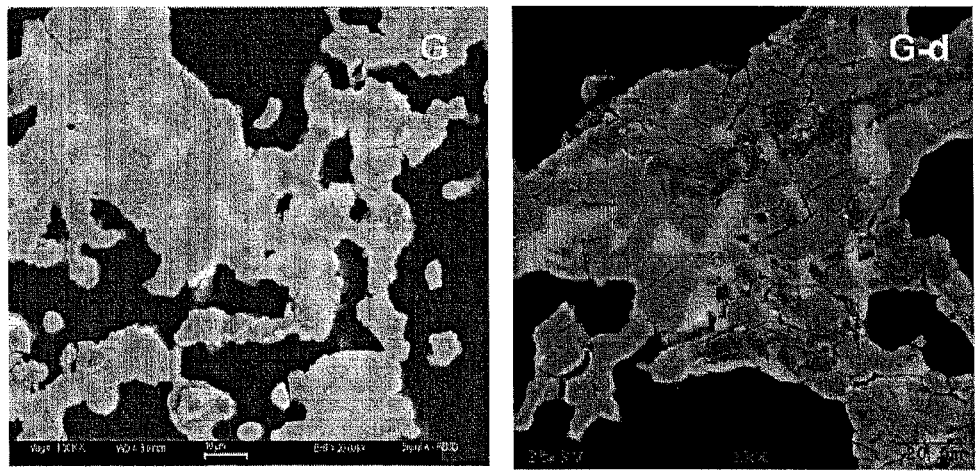
FIGS. 12A to 12F show SEM images of polished cross sections (FIGS. 12A to 12C) and surfaces (FIGS. 12D to 12F) of as-fired ceramic parts and these same ceramic parts after dipping in phosphoric acid and then annealing.
Figure 12B:
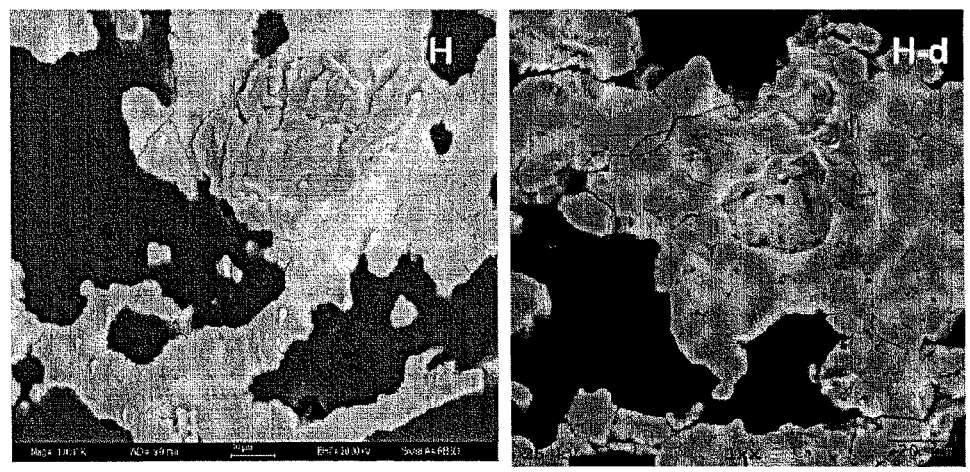
Figure 12C:
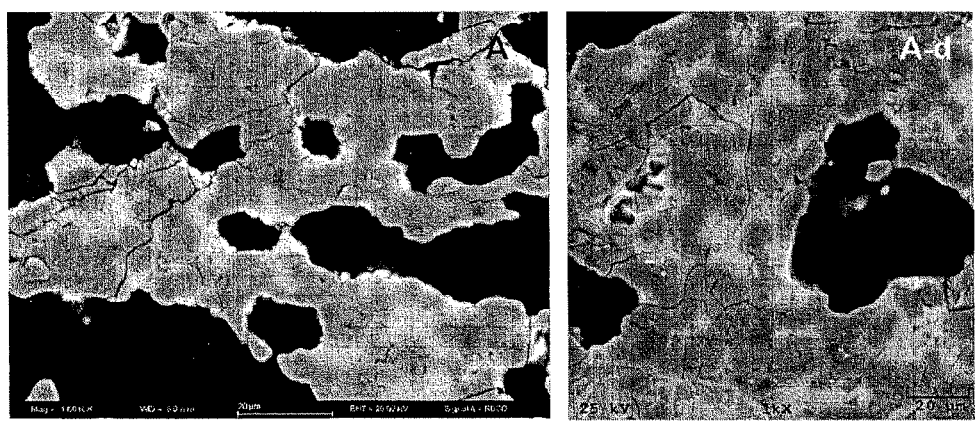
Figure 12D:
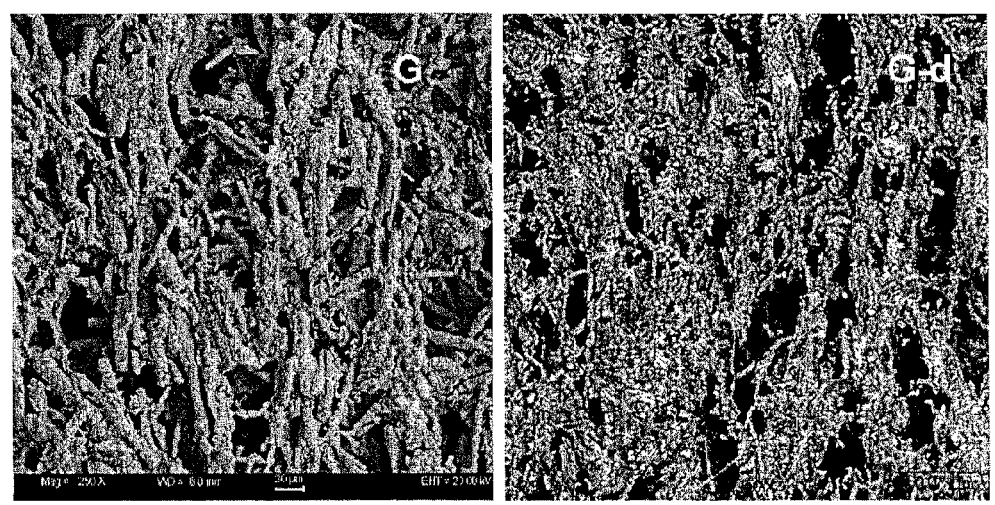
Figure 12E:
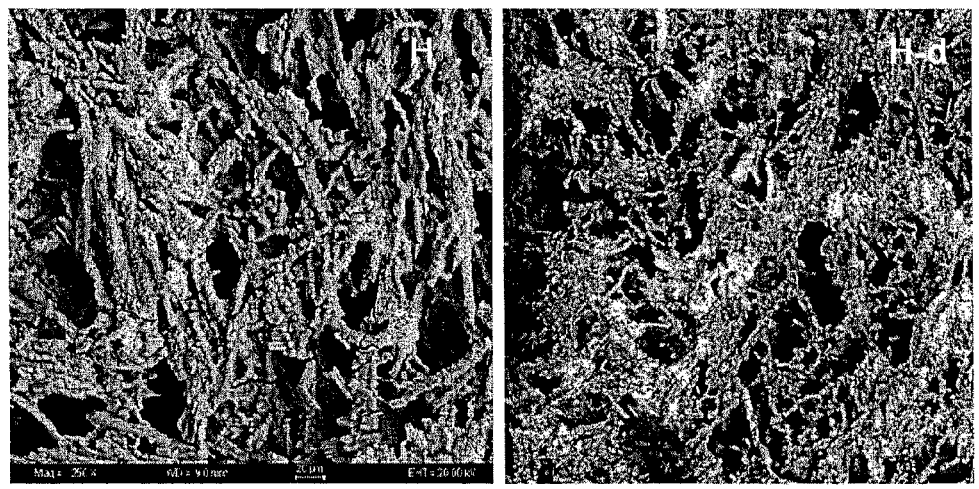
Figure 12F:
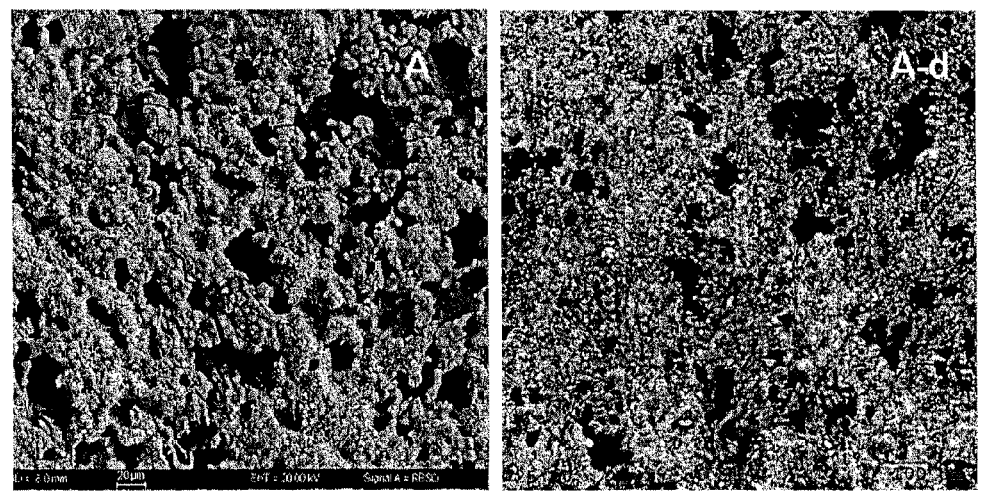

FIGS. 12A to 12F show SEM images of polished cross sections (FIG. 12A to 12C) and surfaces (FIG. 12D to 12F) of as-fired parts and these same parts after being dipped in phosphoric acid and then annealing. FIG. 12A corresponds to as-fired sample G (undipped; left) and G-d (dipped; right). FIG. 12B corresponds to as-fired sample H (undipped; left) and H-d (dipped; right). FIG. 12C corresponds to as-fired sample A (undipped; left) and A-d (dipped; right). FIG. 12D corresponds to the surface of as-fired sample G (undipped; left) and G-d (dipped; right). FIG. 12E corresponds to the surface of as-fired sample H (undipped; left) and H-d (dipped; right). FIG. 12F corresponds to the surface of the as-fired sample A (undipped; left) and A-d (dipped; right). All phosphoric acid-dipped samples show some modification of the feldspar phase compared to the starting materials that result from phosphorous glass that penetrates during annealing along the grain boundaries and interfaces during the post-annealing, and dissolves the feldspar and aluminum-titanate grains while expanding the amount of glass. Part of the post-anneal glass phases crystallize upon cooling after the post-annealing. The microcracks after dipping and annealing are also modified; they follow the AT grain boundaries and are deflected at the feldspar/glass intersections.

While the average CTE is not changed much by the dipping procedure, the increased microcrack density after dipping causes a much larger hysteresis in the heating-cooling cycle for dipped and post-fired parts than in undipped parts.

Figure 13A:
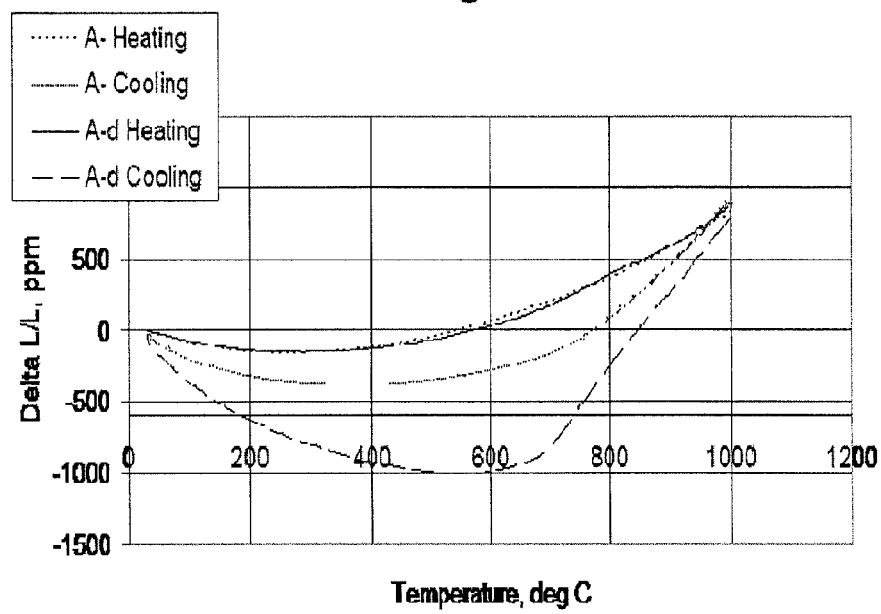
FIGS. 13A, 13B, and 13C, respectively, show CTE results for original fired ceramic parts and phosphoric acid dipped fired ceramic parts for each of samples A, G, and H.
Figure 13B:
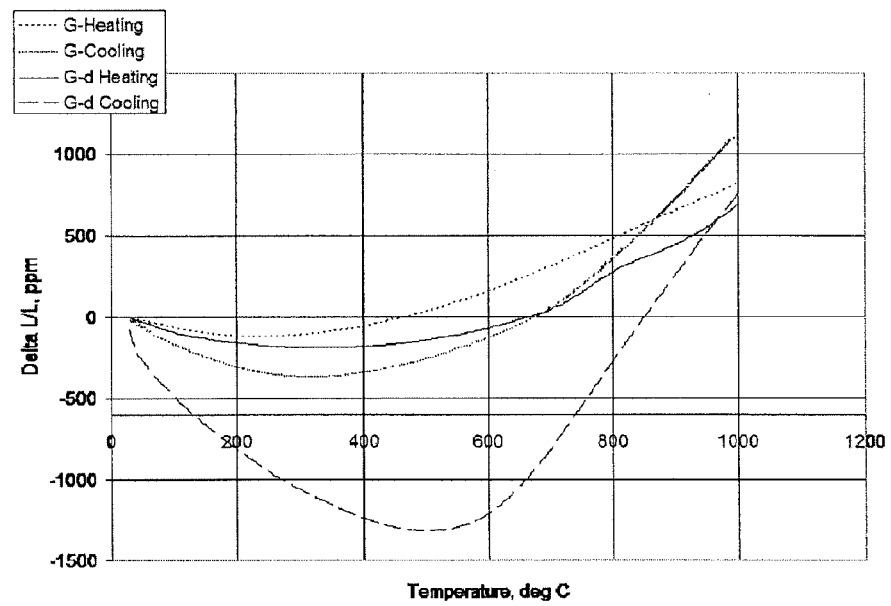
Figure 13C:
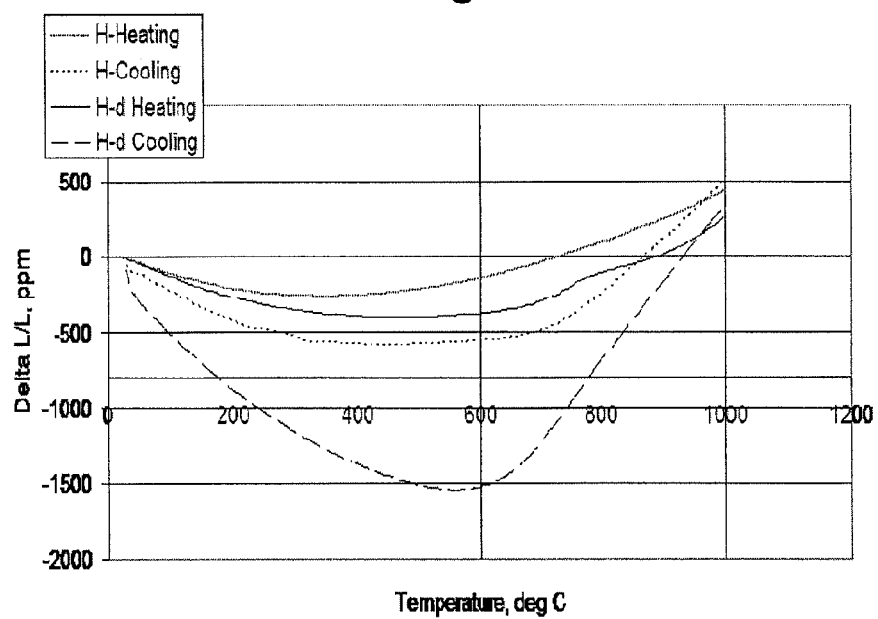

FIGS. 13A, 13B, and 13C show CTE of original, phosphoric acid dipped, and post-fired parts of A, G, and H, respectively. The increase in microcrack density after phosphoric acid dip is also visible in the enhanced thermal hysteresis of the E-mod.

Figure 14A:
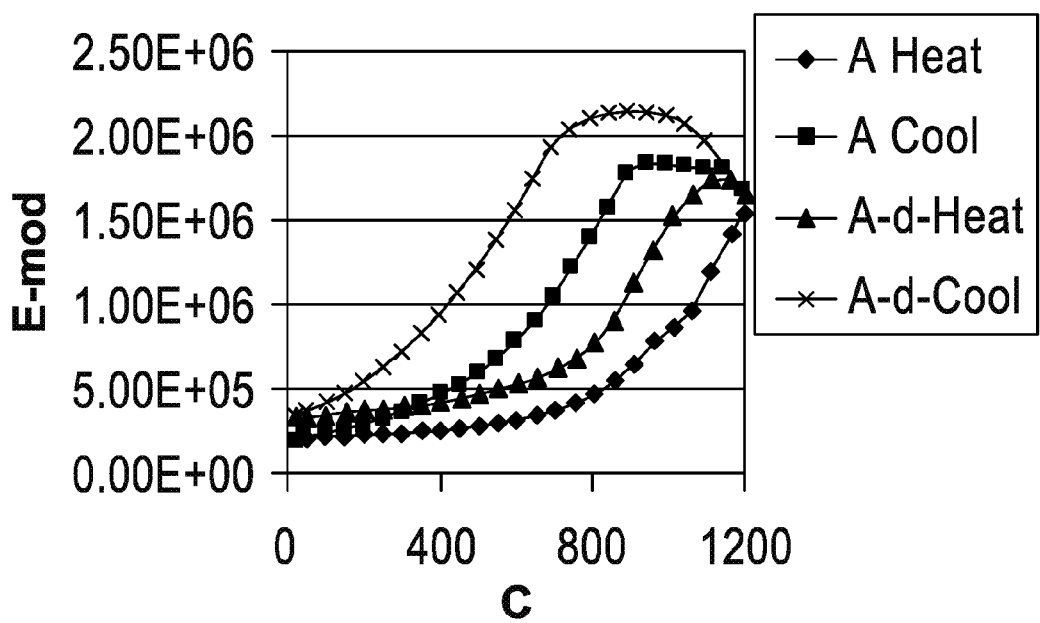
FIGS. 14A, 14B, and 14C show the hysteresis of the elastic modulus during heating and cooling of fired ceramic parts and phosphoric acid dipped fired ceramic parts for samples A, H, and G.
Figure 14B:
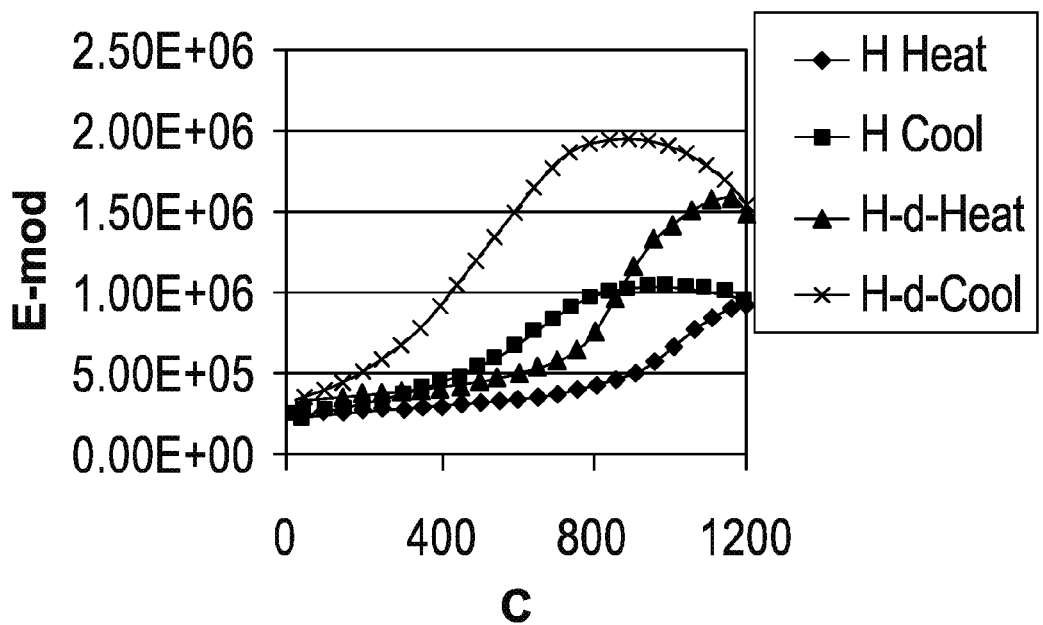
Figure 14C:
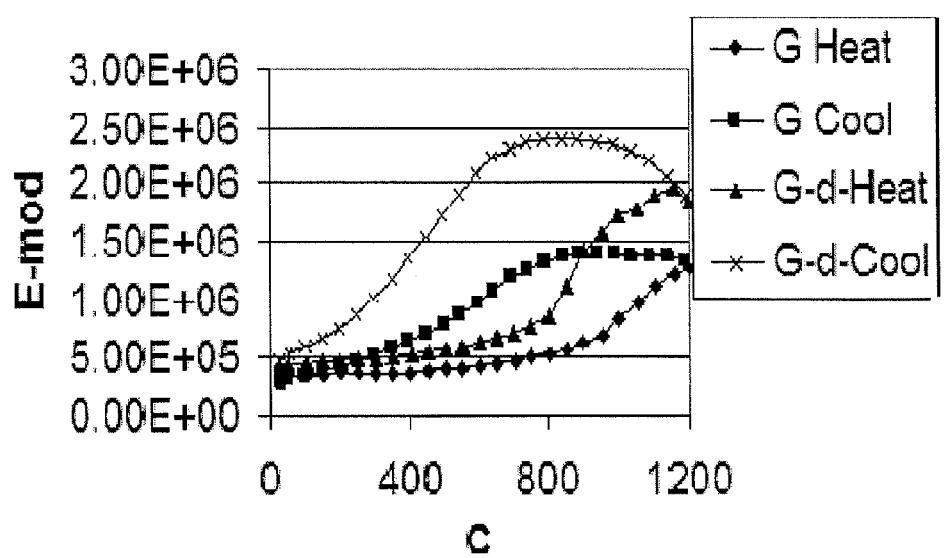

FIGS. 14A, 14B, and 14C, respectively, show the hysteresis of the elastic modulus during heating and cooling of fired-parts and phosphoric acid dipped fired-parts for samples A, H, and G.

Dipping of H parts into a 10% solution of phosphoric acid followed by post-firing at 800° C. or 1000° C. resulted in no alteration in porosity, and an increase in MOR. During firing to 1400° C., a melting event occurred, accompanied by shrinkage and considerable loss of porosity. Table 8 lists the porosity modifications.

TABLE 8

Modification in porosity for MTP as a function of post-annealing temperature

| Extrusion Sample | Acid dip Condition | Post-annealing temperature (C.) | % porosity | d50 (micrometers) | (d50 – d10)/ d50 | CTE (RT to 1000° C.) (in $10^{-7} K^{-1}$) | Fully fired MOR (psi) |
|---|---|---|---|---|---|---|---|
| G | — | — | 61.74 | 14.2 | 0.53 | 8.4 | 310 |
| G-d800° C. | 10% $H_3PO_4$ dip | 800 | 61.58 | 13.5 | 0.59 | | |
| G-d1000° C. | 10% $H_3PO_4$ dip | 1000 | 59.30 | 13.8 | 0.57 | | 195 |
| G-d1400° C. | 10% $H_3PO_4$ dip | 1400 | 46.13 | 17.4 | 0.28 | 7.6 | 467 |

A silica-phosphate glass is formed during post-annealing after dipping, reacts with the feldspar, and dissolves alumina and titania at the periphery of the aluminum titanate grains. The three glass compositions listed in Table 9 were identified by microprobe analysis. The three glass compositions contain high levels of silica with strontium, calcium, phosphorous, alumina, and dissolved titanium, which matches a modified feldspar with compositions of $CaAl_2PSiO_8$, $SrAl_2PSiO_8$, or $NaAl_2PSiO_8$. The glass promotes sintering, eliminates small pores, and narrows the pore size distribution. Once again, the glass yields higher strength; however, the MOR increase achieved by the dipping process is smaller than that obtained by addition of aluminum phosphate to the batch.

TABLE 9

Phosphorous-rich glass compositions in weight % detected by microprobe in wares after dipping in $H_3PO_4$ and then annealing at 1400° C.

| | SrO | $SiO_2$ | CaO | $TiO_2$ | $P_2O_5$ | $Al_2O_3$ | $La_2O_3$ |
|---|---|---|---|---|---|---|---|
| 1 | 11.92 | 39.67 | 3.91 | 6.32 | 13.89 | 20.29 | 0.49 |
| 2 | 11.11 | 39.57 | 4.60 | 6.55 | 17.34 | 19.05 | 0.58 |
| 3 | 10.02 | 40.63 | 3.90 | 3.85 | 15.52 | 23.79 | 1.85 |

Example 4

Materials I, J, K, and L have been batched to contain aluminum titanate and strontium feldspar with residual alumina with additional titania, strontia, lanthanum oxide, and silica to provide 0, 1, 2, and 5% of titanium-strontium-lanthanum silicate glass. An additional batch M was made without any excess alumina and 5% of the same glass.

TABLE 10

|  | Batch in wt % | | | | |
| --- | --- | --- | --- | --- | --- |
|  | I | J | K | L | M |
| INORGANICS |  |  |  |  |  |
| Silica | 8.14 | 8.48 | 9.17 | 9.86 | 10.89 |
| Strontium Carbonate | 7.88 | 7.91 | 7.96 | 8.01 | 8.78 |
| Calcium Carbonate | 1.38 | 1.41 | 1.48 | 1.54 | 1.85 |
| Titanium Dioxide | 31.72 | 31.53 | 31.17 | 30.81 | 31.50 |
| Lanthanum Oxide |  | 0.03 | 0.08 | 0.13 | 0.13 |
| Alumina | 50.88 | 50.64 | 50.15 | 49.66 | 46.87 |
| Total | 100 | 100 | 100 | 100 | 100 |
| PORE FORMER Superaddition |  |  |  |  |  |
| Potato Starch | 15 | 15 | 15 | 15 | 15 |
| SOLID BINDERS/ORGANICS |  |  |  |  |  |
| Methylcellulose | 4.5 | 4.5 | 4.5 | 4.5 | 4.5 |
| OTHER LIQUID ADDITIONS |  |  |  |  |  |
| Emulsion T - | 16 | 16 | 16 | 16 | 16 |

TABLE 11

| Batch | % Glass | CTE (RT to 1000° C.) in 10−7 K−1 | MOR in psi | Porosity in % | Medium pore size in microns | (d50 − d10)/d50 |
| --- | --- | --- | --- | --- | --- | --- |
| I | 0 | 16.9 | 241 | 51.52 | 17.83 | 0.44 |
| J | 1 | 10.6 | 211 | 52.11 | 17.83 | 0.44 |
| K | 3 | 6 | 238 | 50.48 | 17.21 | 0.42 |
| L | 5 | 5.4 | 270 | 49.89 | 18.23 | 0.38 |
| M | 5 | 3.3 | 252 | 45.62 | 21.45 | 0.31 |

While the addition of glass does not introduce any loss in porosity and in median pore size, it does impact the strength of the sample. As-measured MOR and normalized MOR show a significant increase with increased glass level in the sample. The zero glass reference does not follow the trend, because a "zero" glass level sample is difficult to batch due to natural impurities in the raw materials and therefore resulted in a slightly modified phase mixture.

Figure 15:
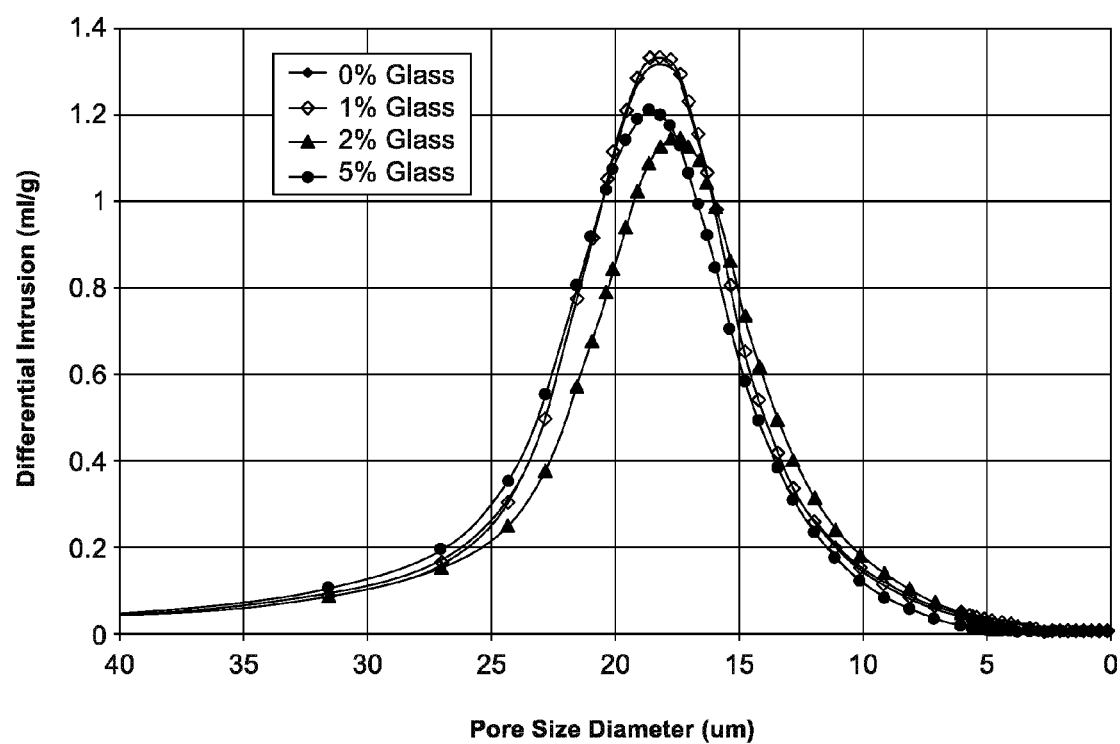
FIG. 15 shows pore size distribution results for aluminum titanate-strontium feldspar composite samples having varying glass content.

FIG. 15 shows pore size distribution results for aluminum titanate-strontium feldspar composite samples I, J, K, and L having 0, 1, 2, and 5 wt % glass content. Despite significant changes in the glass level, only minor changes occur in the pore size distribution. No decrease in median pore size due to enhanced sintering in presence of the glass phase was observed. For 5% of glass, even a small increase in median pore size compared to the materials with lower or no glass level can be noticed. The 5% glass containing material in addition shows a significant decrease in its fraction of small size pores compared to the other materials, thus promising less pressure drop due to a narrower pore size distribution.

Figure 16A:
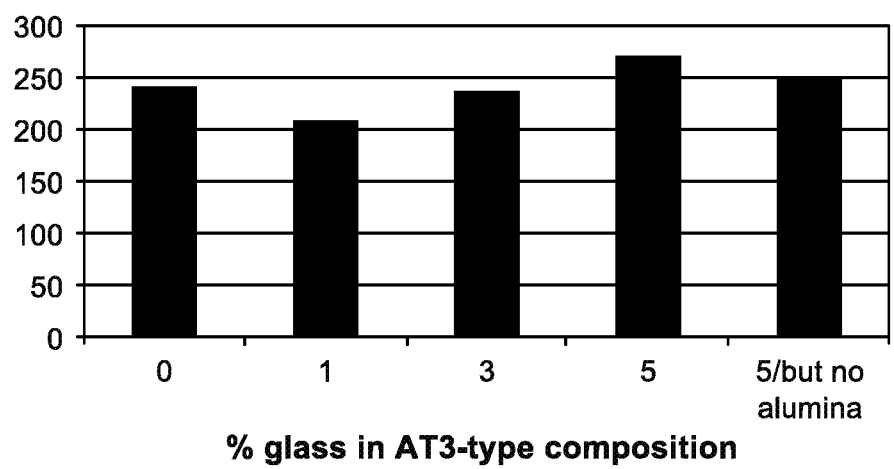
FIGS. 16A and 16B show as-measured MOR (FIG. 16A) and porosity-normalized MOR (16B) of selected aluminum titanate-strontium feldspar composites having different glass levels.
Figure 16B:
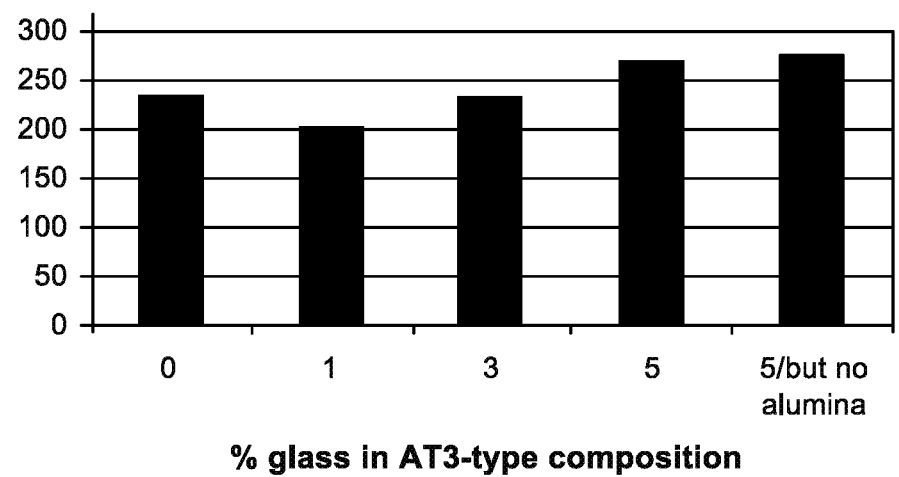

FIGS. 16A and 16B show bar charts of as-measured MOR (16A) and porosity-normalized MOR (16B) of selected aluminum titanate-strontium feldspar composites having excess alumina, 0, 1, 3, or 5% glass, and a composite without excess alumina phase and 5% glass. It can be difficult to batch a material with zero glass content. Small impurities can be present and can induce formation of small levels of undesired second phases, including non-defined glasses. Therefore, the material with a zero glass level will be excluded from the comparison. It does not have exactly the same phase distribution as the other materials. For the other materials with 1-5% glass content, a continuous increase in MOR with the glass content can be observed. The increase in MOR may be attributed to the toughening mechanisms that are introduced by the glass films and contribute to decrease the subcritical crack growth during the four point flexure MOR test, so that the strength of the material is improved. Imaging of the materials has shown that cracks strongly interact with the glass grain boundary film, choose the glass film as preferential crack propagation path, and interact strongly at grain interceptions with branching glass at triple points.

Example 5

Addition of boron oxide for glass formation in AT. Table 12 lists low levels (e.g., 0.5 to 2 wt %) of boron oxide that were added as glass former to a cordierite-mullite-aluminum titanate composite having 6 wt % MgO, batch N. Batch O contains 0.5%, batch P 1%, and batch Q 2% has boron oxide.

TABLE 12

| Batch | Batch | | | |
| --- | --- | --- | --- | --- |
| Ingredient Wt % | N | O | P | Q |
| alumina | 45.1 | 45.1 | 45.1 | 45.1 |
| silica | 14.7 | 14.7 | 14.7 | 14.7 |
| titania | 34.1 | 34.1 | 34.1 | 34.1 |
| magnesia | 6.1 | 6.1 | 6.1 | 6.1 |
| total inorganics | 100% | 100% | 100% | 100% |
| superaddition $B_2O_3$ | 0 | 0.5 | 1 | 2 |
| superaddition pore former | 20 | 20 | 20 | 20 |

XRD (not shown) of the samples shows as a main phase $(Mg, Al, Ti)_3O_5$ and mullite; cordierite is present as minor phase. While the main phases do not change with addition of boron, the cordierite phase fraction decreases with boron addition, due to incorporation of silica in the glass phase.

Table 13 summarizes intermediate firing properties and properties of the fully fired samples of CMAT with 6% MgO and 0 to 2% addition of boron oxide.

TABLE 13

| Batch | % $B_2O_3$ | % porosity | d50 (microns) | CTE (RT to 1000 C.) | (d50 − d10)/d50 | At 600° C. MOR (psi) | At 800° C. MOR (psi) | fully fired compression strength (psi) |
|---|---|---|---|---|---|---|---|---|
| N | 0 | 48.3 | 15.3 | 13.2 | 0.28 | | | 1244 |
| O | 0.5 | 48.8 | 14.8 | 11.3 | 0.28 | | | 1122 |
| P | 1 | 35.4 | 15.6 | 15 | 0.18 | 60 (308 Humidity aged) | 64 (158 Humidity aged) | 1713 |
| Q | 2 | 34.9 | 16.7 | 27.1 | 0.17 | | 75 (95 Humidity aged) | 1802 |

The resulting properties listed in Table 13 had findings similar to preceding examples. With addition of boron oxide above 0.5%, the overall porosity in fired materials decreased, while the median pore size increased and the d-factor decreased as a result of promoted sintering in the presence of the glass phase and loss of small porosity. The material strength apparently increases substantially with boron oxide additive of greater than 0.5%. For the lowest level of boron oxide of 0.5%, the additive level was too low to produce a significant glass level with a homogeneous distribution and good wetting of the boundaries. Additionally, the intermediate firing strength was strongly improved in presence of boron oxide. While boron oxide-free (or 0.5% and below) batches have such low strength that the firing strength cannot be easily measured, samples having 1 and 2% show acceptable firing strength of 64 and 75psi or after humidity aging prior to firing of 158 and 95 psi, respectively.

Figure 17:
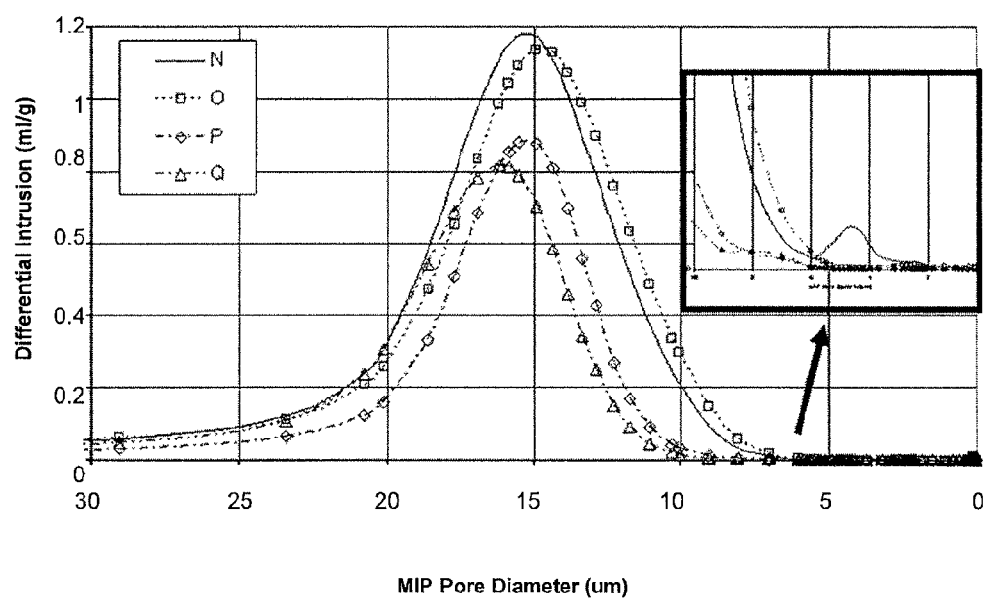
FIG. 17 shows pore size distribution properties of alumina-cordierite-mullite (MgO) composites having boron oxide addition in the batch and compared to a boron-oxide free control.

FIG. 17 shows pore size distributions of alumina-cordierite-mullite composites having 6% MgO, and having 0% (sample N; control), 0.5% (sample O), 1 (sample P), or 2 wt % (sample Q) of boron oxide addition in the batch. FIG. 17 shows the global pore size distribution and the FIG. 17 insert shows an enlarged shoulder in the region of small sizes, especially for sample N (0% boron oxide addition; control). It can be seen that compared to the glass-free material, the addition of an alumino-titanio-lanthano-silicate glass helps to shift the median pore size to larger values and at the same time to suppress the small pores. While an increase in median pore size is only visible for 3 and 5% of glass, the loss of small pores (shoulder in the insert for the glass free batch) is efficiently realized already for 1% glass addition.

Characterization Techniques

Microstructure characterization. Standard scanning electron microscopy (SEM) characterization was conducted on honeycomb wall surfaces and polished honeycomb cross sections (cut perpendicular to the honeycomb channels). For the observation of polished sections, the fired ware was infiltrated with epoxy, sliced and polished. The spatial distribution of porosity and phases present at a microscopic level was visualized on polished sample cross sections. The material porosity PSEM in %, average pore size $d_{average}$, SEM were evaluated by SEM in combination with image analysis techniques.

Orientation mapping (SEM/EBSD). Electron backscattered diffraction (EBSD) on the SEM was used for orientation mapping of polished sample sections to derive grain size, relative orientation, and texture of the phases present with respect to the honeycomb geometry. The samples were embedded in epoxy, carefully polished and coated with a thin (10 Å) layer of iridium. All EBSD analysis was completed on a Hitachi SU70 SEM, equipped with an Oxford/HKL EBSD system. Data collection was completed for areas of approximately 1900 micrometers×700 micrometers at 23×10-9 Ampere beam current, 20 kV accelerating potential, an inter-step of 2 micrometers for overall orientation information and 0.2 micrometers for grain size determination. Phases used for identification of fully fired AT materials included aluminum titanate, corundum, rutile, and feldspar (Ca, Sr aluminum silicate). Pole figures were generated using HKL Mambo software with 5° data clustering.

Porosimetry. Pore size distributions were explored by mercury intrusion porosimetry using an Autopore IV 9500 porosimeter. This method uses the capillary law with non-wetting liquid and cylindrical pores. It is typically expressed with the Washburn equation $D=-(1/P) 4y \cos \theta$, where D is the pore diameter, P the applied pressure, y the surface tension, and θ the contact angle. The volume of mercury is directly proportional to the pressure. Micrometrics software data reduction uses the differential and log differential to calculate the first derivative of the cumulative specific intrusion volume as a function of calculated log diameter.

Thermal expansion. Thermal expansion was measured for bar-shaped samples with dimension 0.25"×0.25"×2" during heating from room temperature to 1200° C. at a rate of 40K/min and subsequent cooling to room temperature. For the data reported in the property Table 13, the long axis of the test bars was oriented in the direction of the honeycomb channels, to provide the thermal expansion in the axial direction of the honeycomb parts.

Average thermal expansion coefficients for various temperature ranges were recorded in the property Table 13, $CTE_{20-800}$ in K-1, the average thermal expansion coefficient from room temperature to 800° C., defined as L(800° C.)−L(20° C.)/780 as average thermal expansion coefficient in the temperature range from room temperature to 800° C., $CTE_{20-1000}$ in K-1, the average thermal expansion coefficient from room temperature to 1000° C., defined as L(1000° C.)−L(20° C.)/980 as average thermal expansion coefficient in the temperature range from room temperature to 1000° C., $CTE_{500-9000}$ in K-1, the average thermal expansion coefficient from 500 to 900° C., defined as L(900° C.)−L(500° C.)/400 as average thermal expansion coefficient in the temperature range from 500° C. to 800° C. $CTE_{5}oo$-goo is of particular importance for the application of honeycomb parts for exhaust after treatments in the automotive vehicle, where the honeycomb part is subjected to severe rapid temperature changes and where the temperature range from 500 to 900° C. would match a frequently encountered operation temperature range.

Mechanical strength. A ceramic's strength can be tested using three or four bending. The maximum stress prior to failure is often referred to as the modulus of rupture or MOR. Strength values (4-point flex, MOR) have been measured using four point flexure with a lower span of 2" (50.8 mm) and an upper span of 0.75" (19 mm). The specimen geometry for the 4-point flexure tests was 2.5" (63.5 mm) in length, 0.5" (12.7 mm) in width and 0.25" (6.4 mm) thick. The force-measuring system used was equipped with a read-out of the maximum force and a calibrated load cell. The MOR value was calculated using the flexure strength equation.

$$\sigma_{4\text{-point},MOR} = \frac{3}{4}\frac{PL}{bd^2}$$

However, this equation does not account for the cellular channels through the specimen and is not the true strength of the material. All specimens tested had a square cellular (honeycomb) with the channels in the direction of the length. The actual material strength, often referred to as the wall strength ($\sigma^{wall}$), has to be determined by accounting for the cellular structure.

Elastic modulus measurement. Bar-shaped samples with dimension 5"×1"×0.5" and the long axis being oriented in the direction of the honeycomb channels were used to measure the elastic modulus by flexural resonance frequency. Samples were heated to 1200° C. and cooled back to room temperature. For each temperature the elastic modulus was directly derived from the resonance frequency and normalized for sample geometry and weight by referring to ASTM C 1198-01.

Strain tolerance. A strain tolerance MOR/E-mod can be derived from the strength of the material and its Young's modulus. This strain tolerance describes the ability of a material to handle strain. The higher the strain tolerance, the less likely the material will fracture. The strain tolerance is independent of the honeycomb geometry and can directly be compared for parts with different cell densities or wall thickness.

Thermal shock. The resistance to thermal shock for a honeycomb for use as an automotive exhaust after-treatment is significant because the part undergoes severe thermal cycling during rapid heat up, cool down, and during regeneration. Thermal shock resistance of materials is often predicted by a figure-of-merit. The most common of these is the R parameter, which is simply the temperature difference which will result in a stress that exceeds the strength of the material. A second thermal shock figure-of-merit is the $R_{st}$ parameter that takes into account the pre-cracked state of a material, and is similar to the R parameter except that it takes into account the toughness (K) of the material instead of the strength. The thermal shock resistance of a honeycomb is expected to improve with high strength, high toughness, low elastic modulus, and low thermal expansion of its material.

$$R = \frac{\sigma}{\alpha \cdot E}$$
$$R_{st} = \frac{K}{\alpha \cdot E}$$

Any aspect, feature, or embodiment of the foregoing disclosure can be used in any combination or permutation with any one or more other aspect, feature, or embodiment recited in the appended claims.

The disclosure has been described with reference to various specific embodiments and techniques. However, many variations and modifications are possible while remaining within the scope of the disclosure.

What is claimed is:

1. A method for improving the thermo-mechanical properties of a highly porous ceramic composite, the composite having grains of an aluminum-titanate crystalline phase, and grains of a strontium-feldspar crystalline phase, and an intergranular glass phase between the grains of the aluminum-titanate crystalline phase and the strontium-feldspar crystalline phase, the method comprising:
   combining a glass source, a source of the aluminum-titanate crystalline phase, a source of the strontium-feldspar crystalline phase, and a pore former, into a batch composition; and
   firing the combined batch composition at 1390 to 1410° C. to produce the highly porous ceramic composite,
   wherein the intergranular glass phase is a partially or fully interconnected film along the grain boundaries and the interfaces of the composite,
   the intergranular glass phase has a thickness of 20 nm to 500 nm,
   the porosity of the highly porous ceramic composite is greater than 45%, and
   the coefficient of thermal expansion of the highly porous ceramic composite at from 25 to 800° C. is less than $10 \times 10^{-7} K^{-1}$.

2. The method of claim 1 wherein the glass source comprises at least one of a lithium oxide, a boron oxide, a silica, a phosphorus oxide, a precursor or source of any of the foregoing, or mixtures thereof.

3. The method claim 1 wherein the source of the aluminum-titanate crystalline phase comprises an aluminum source and a titania source.

4. The method of claim 1 wherein combining of the glass source comprises at least one of:
   adding a combination of silica and an alkali oxide source to the batch composition in an amount of 0.3 to 5 wt %;
   adding a phosphorous oxide source to the batch composition in an amount of 0.1 to 3 wt %;
   adding a boron oxide source to the batch composition in an amount of 0.1 to 2 wt %;
   or a combination thereof, the weight % being based on a glass source superaddition relative to the weight of the batch composition.

5. The method of claim 1 wherein glass source produces a glass or glass-ceramic phase during an early stage of firing the batch, and the glass or glass-ceramic phase transforms during a later stage of firing the batch, the transformation comprising at least one of:
   a partial glass or glass-ceramic phase evaporation;
   a glass or glass-ceramic phase crystallization;
   a glass or glass-ceramic phase incorporation into the aluminum-titanate phase;
   or a combination thereof.

6. The method of claim 1 wherein the firing is accomplished at 1390° C. to 1410° C. for 10 to 20 hours.

7. The method of claim 1 wherein combining the glass source causes:
   the firing temperature to be reduced by at least 25° C.;
   the firing time to be reduced by at least 10%;
   or a combination of reduced firing temperature and reduced firing time, compared to the method and product prepared free of the glass source.

8. The method of claim 1 wherein combining and firing the batch including the glass source accelerates aluminum-titanate formation during an initial stage of firing the batch, at lower temperature, in less time, or both, compared to firing an identical batch but without the glass source present.

9. The method of claim 1 wherein the composite has a higher strength by 5 to 25% compared to the composite made with a batch without the glass source and having the same porosity and the same CTE.

* * * * *